Figure 1:
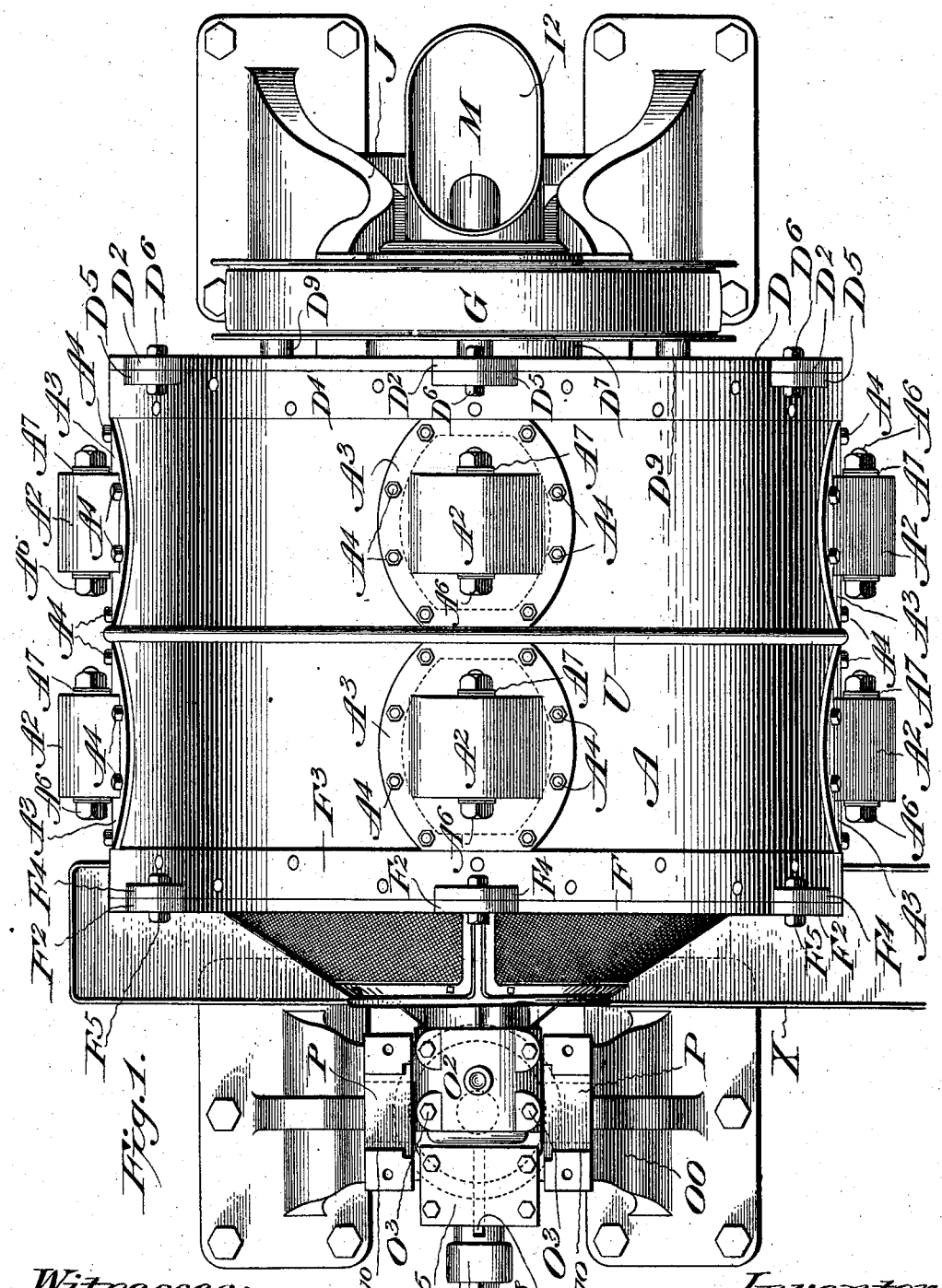

No. 858,495. PATENTED JULY 2, 1907.
H. S. BAILEY.
ORE GRANULATOR.
APPLICATION FILED OCT. 27, 1902.

18 SHEETS—SHEET 1.

Witnesses:

Inventor:
Howard S. Bailey.

No. 858,495. PATENTED JULY 2, 1907.
H. S. BAILEY.
ORE GRANULATOR.
APPLICATION FILED OCT. 27, 1902.

18 SHEETS—SHEET 2.

Witnesses:

Inventor:
Howard S. Bailey

No. 858,495.
PATENTED JULY 2, 1907.
H. S. BAILEY.
ORE GRANULATOR.
APPLICATION FILED OCT. 27, 1902.
18 SHEETS—SHEET 3.
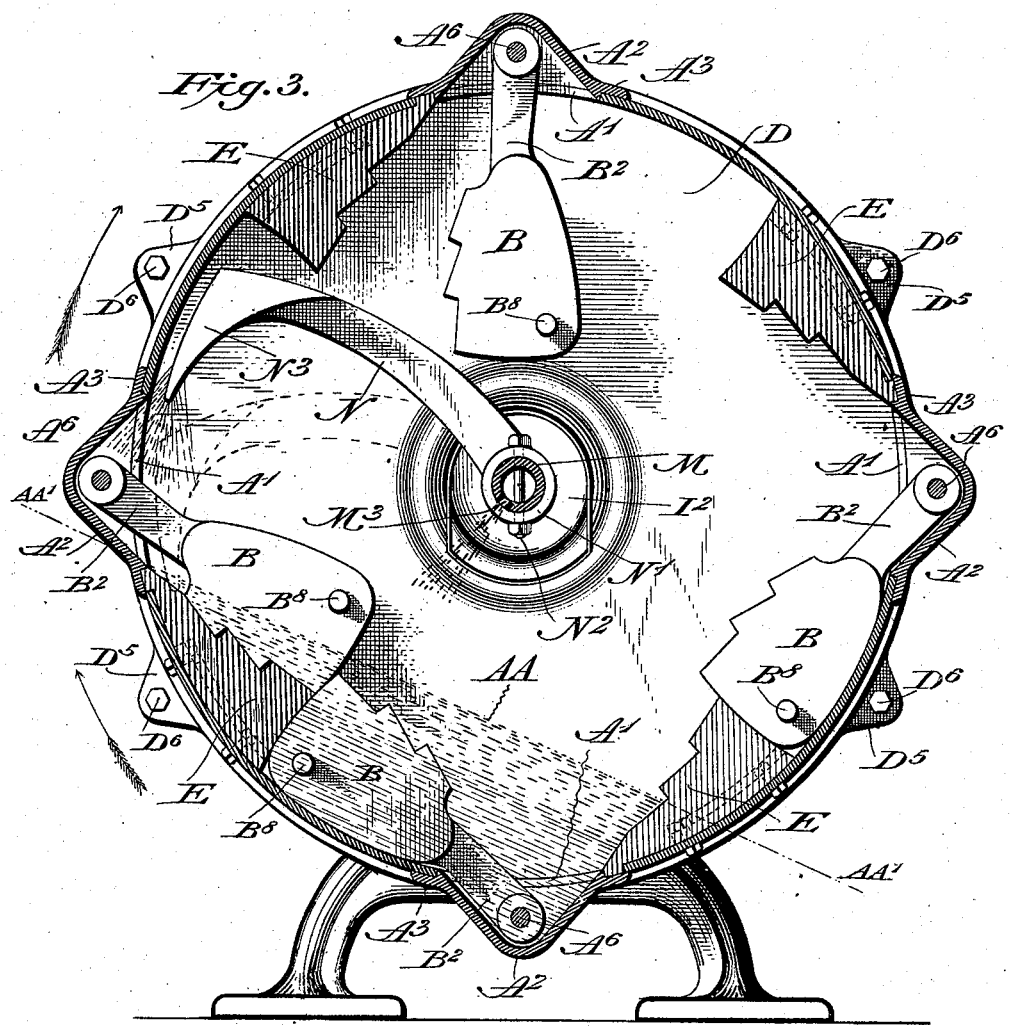
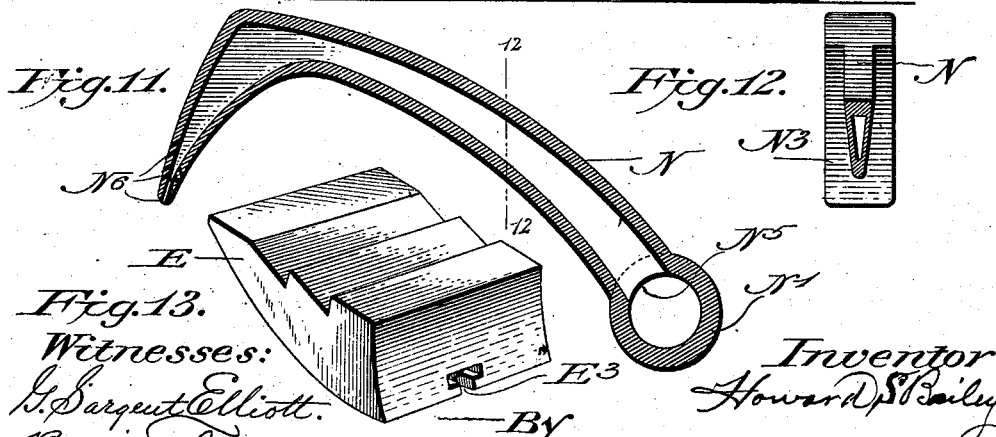
Witnesses:
Inventor:
Howard S. Bailey
By No. 858,495. PATENTED JULY 2, 1907.
H. S. BAILEY.
ORE GRANULATOR.
APPLICATION FILED OCT. 27, 1902.
18 SHEETS—SHEET 4.
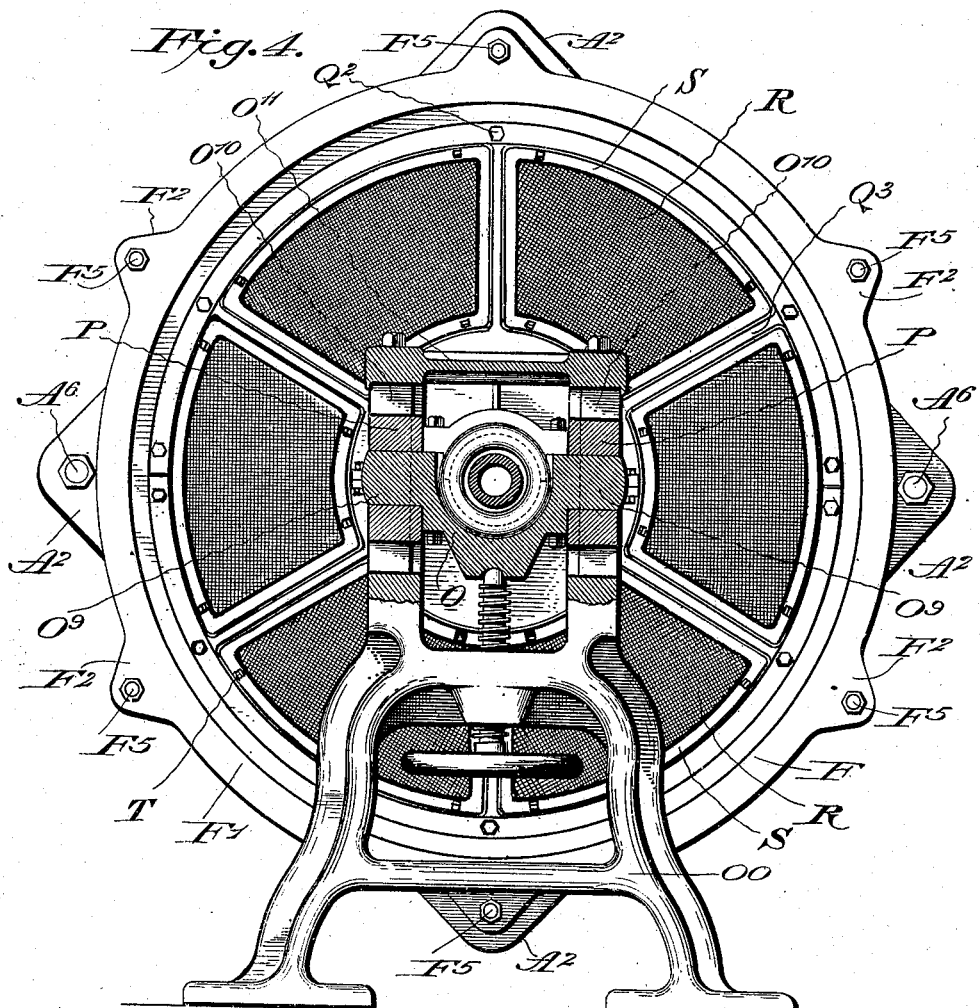
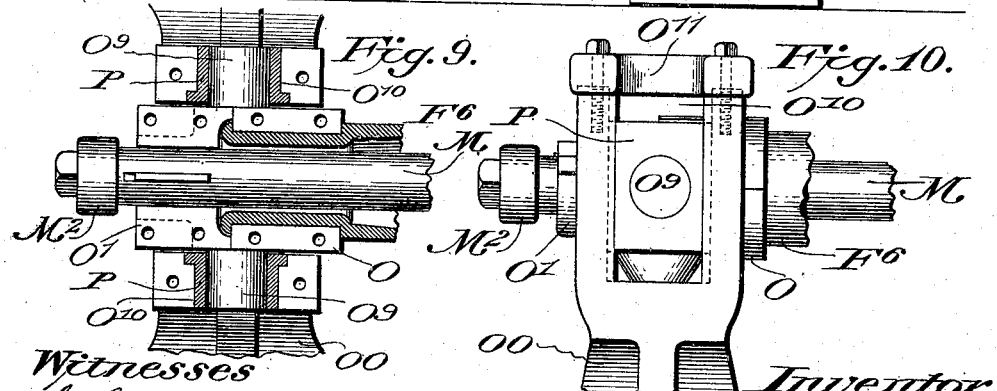

No. 858,495. PATENTED JULY 2, 1907.
H. S. BAILEY.
ORE GRANULATOR.
APPLICATION FILED OCT. 27, 1902.
18 SHEETS—SHEET 5.
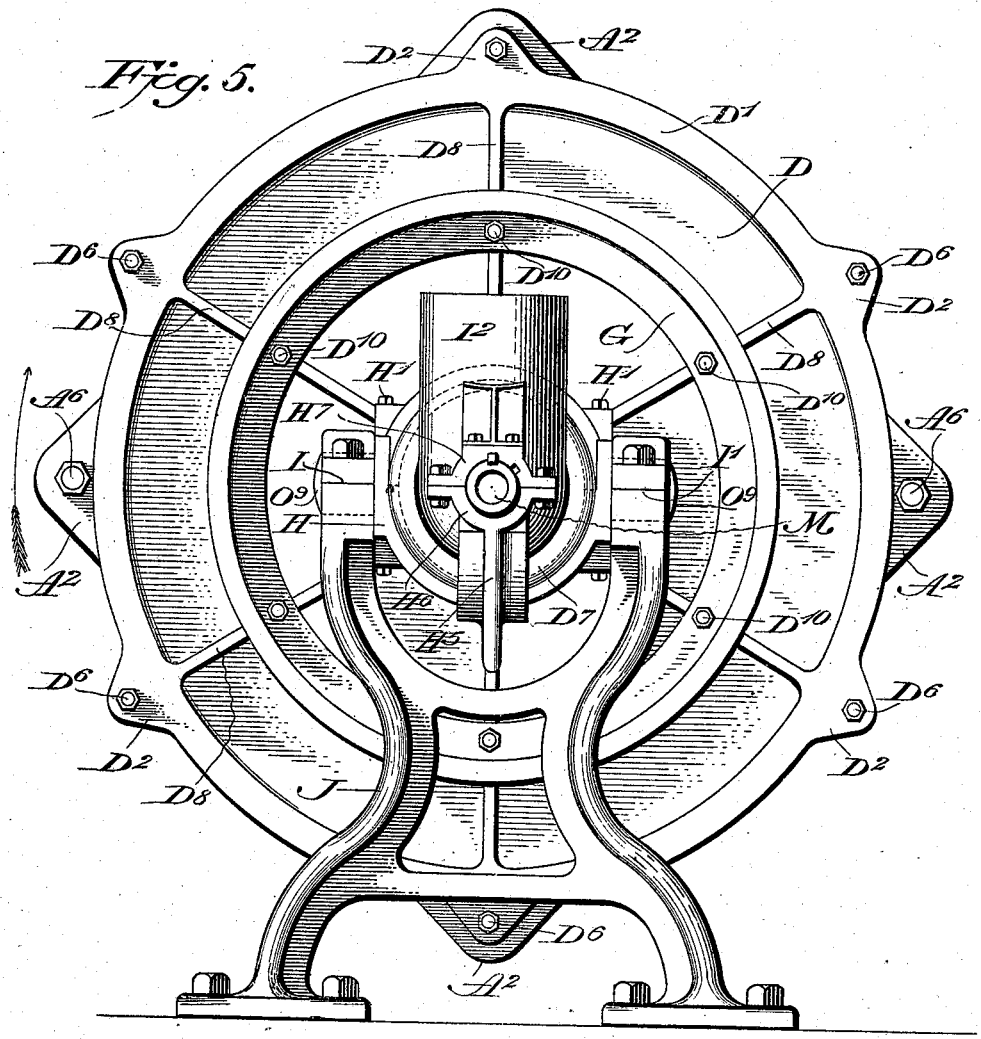
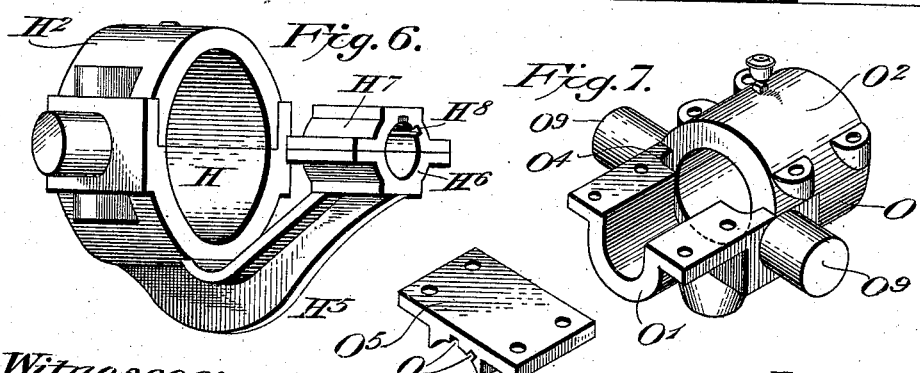
Witnesses:
Inventor:
Howard S. Bailey No. 858,495. PATENTED JULY 2, 1907.
H. S. BAILEY.
ORE GRANULATOR.
APPLICATION FILED OCT. 27, 1902.
18 SHEETS—SHEET 6.
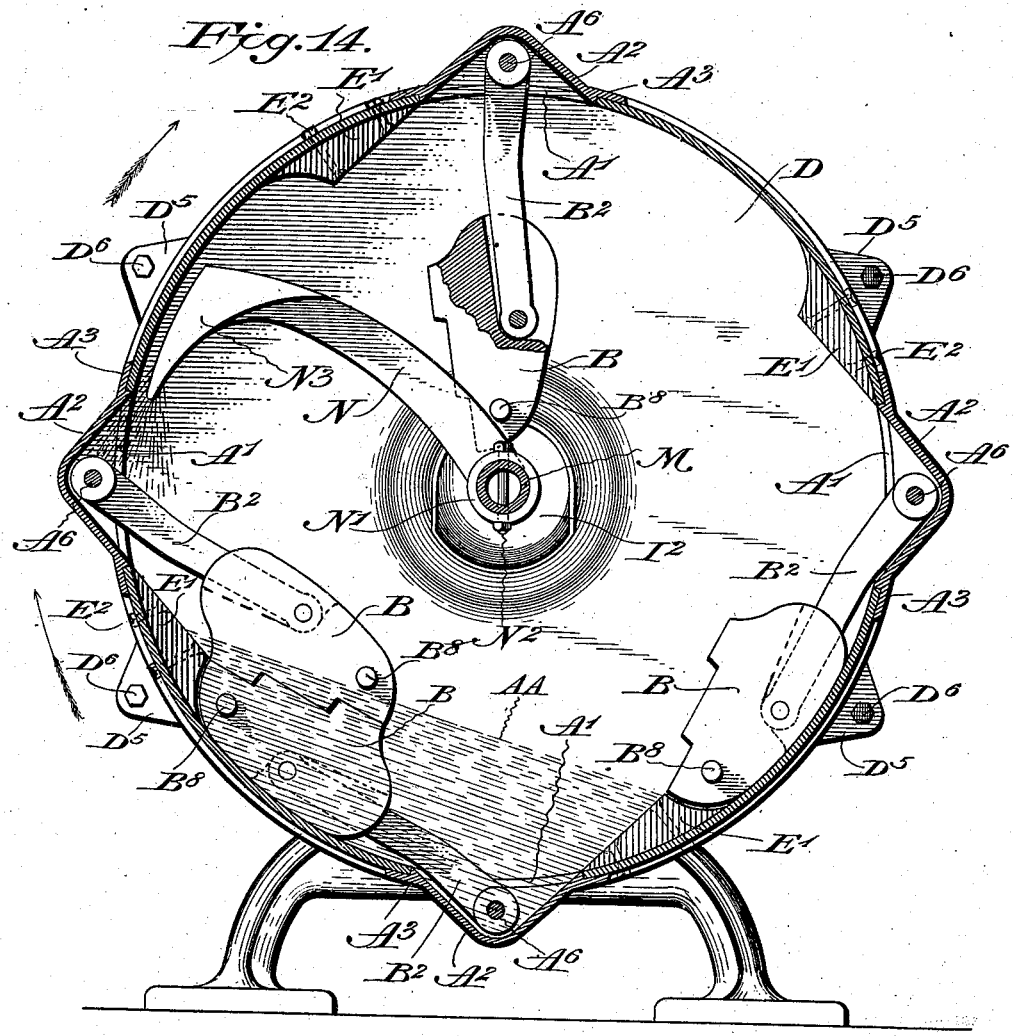

No. 858,495. PATENTED JULY 2, 1907.
H. S. BAILEY.
ORE GRANULATOR.
APPLICATION FILED OCT. 27, 1902.
18 SHEETS—SHEET 7.
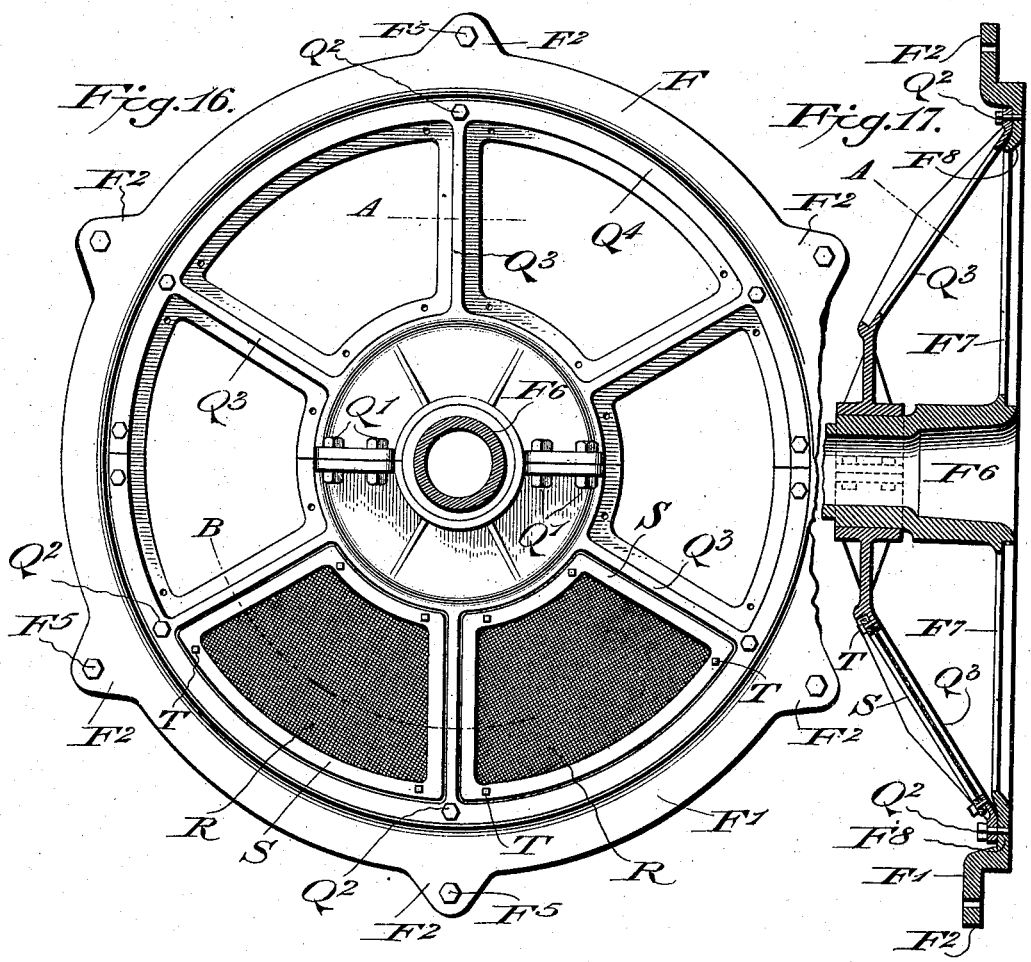
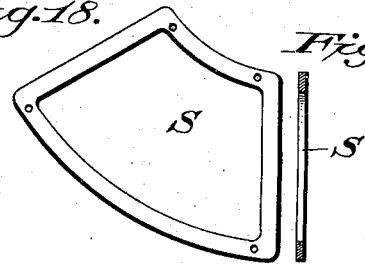
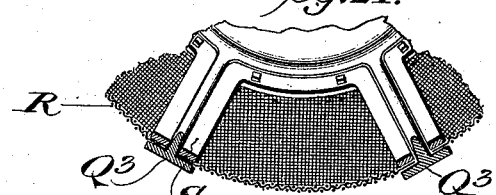
Witnesses:
G. Sargent Elliott.
Bessie Thompson.
Inventor:
Howard S. Bailey

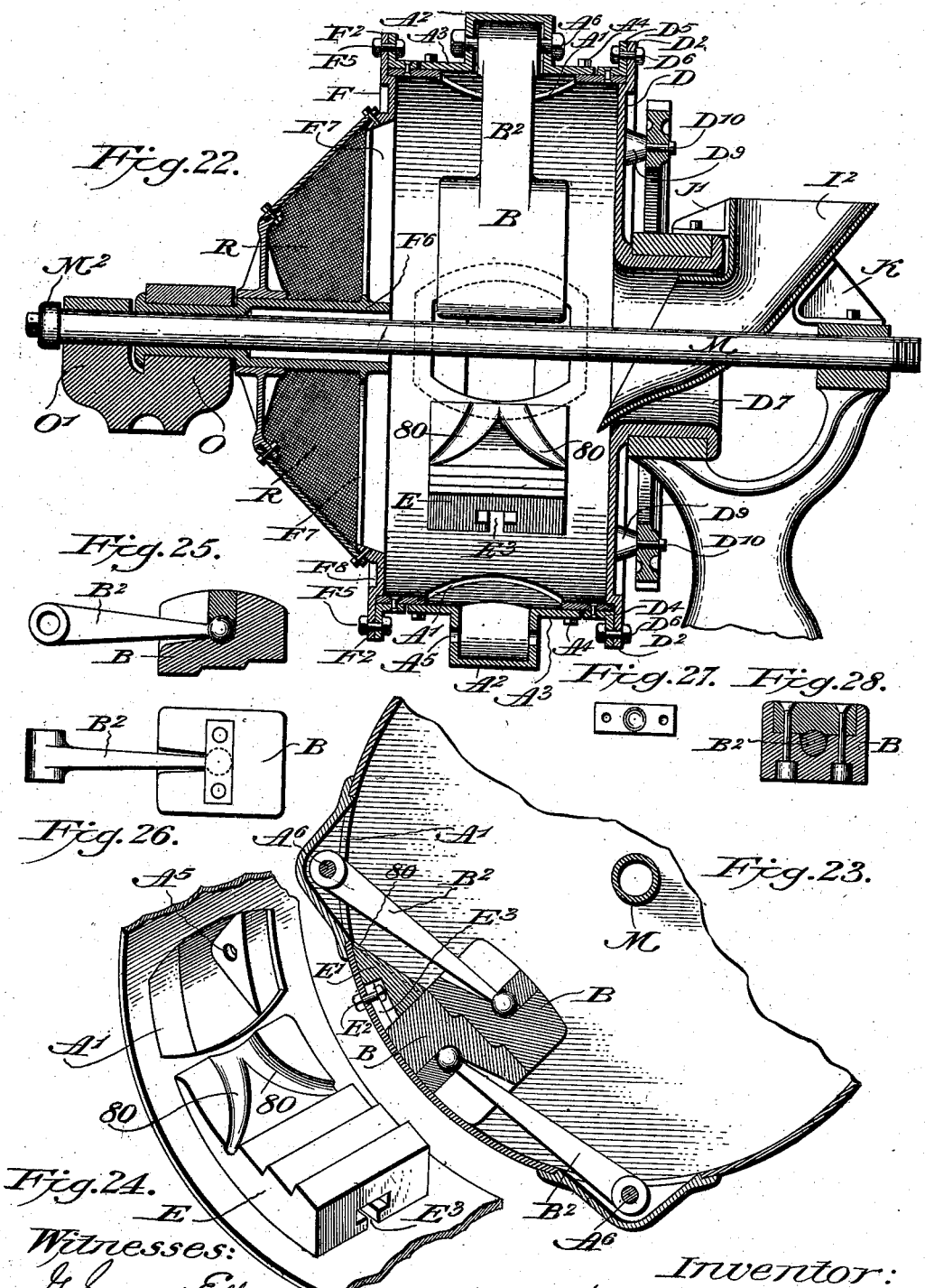

No. 858,495. PATENTED JULY 2, 1907.
H. S. BAILEY.
ORE GRANULATOR.
APPLICATION FILED OCT. 27, 1902.
18 SHEETS—SHEET 9.
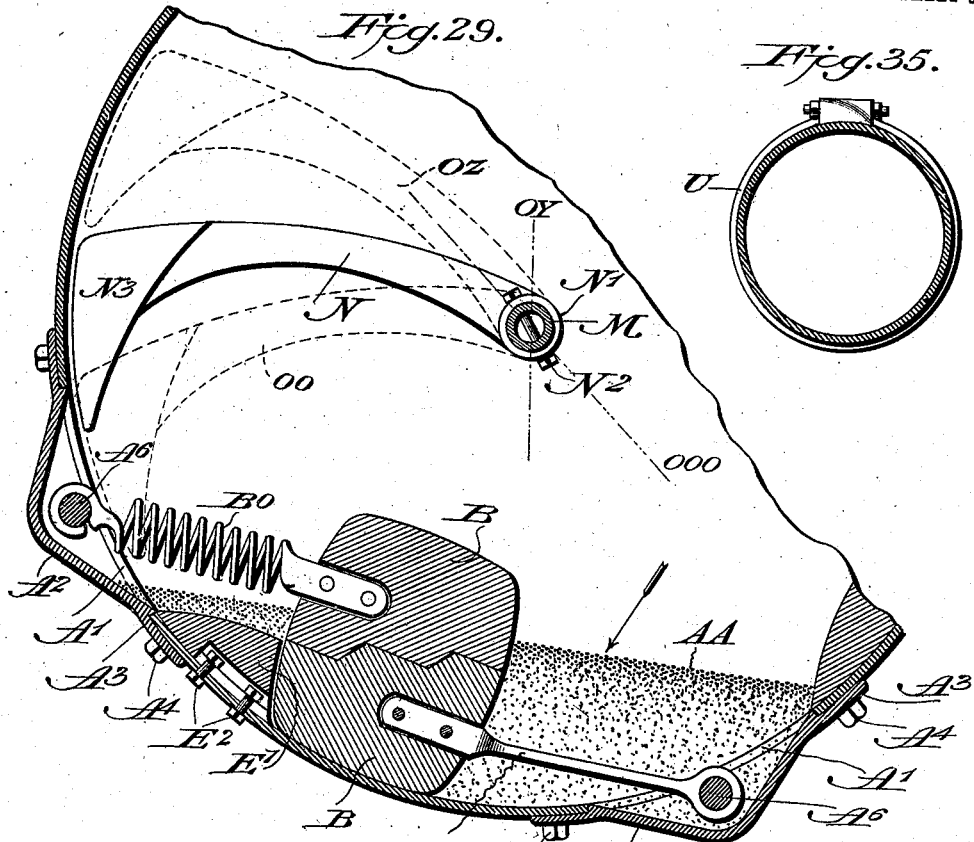
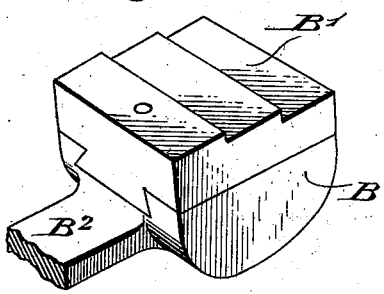
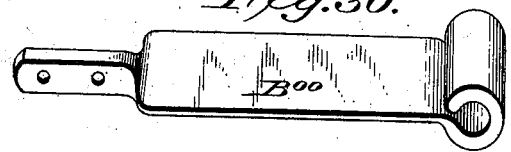
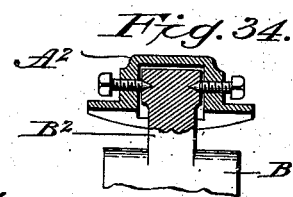
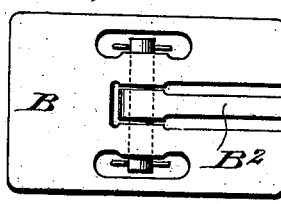
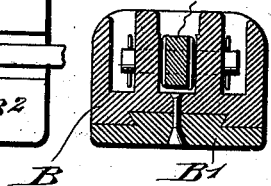
Witnesses:
Inventor:
Howard S Bailey No. 858,495. PATENTED JULY 2, 1907.
H. S. BAILEY.
ORE GRANULATOR.
APPLICATION FILED OCT. 27, 1902.
18 SHEETS—SHEET 10.
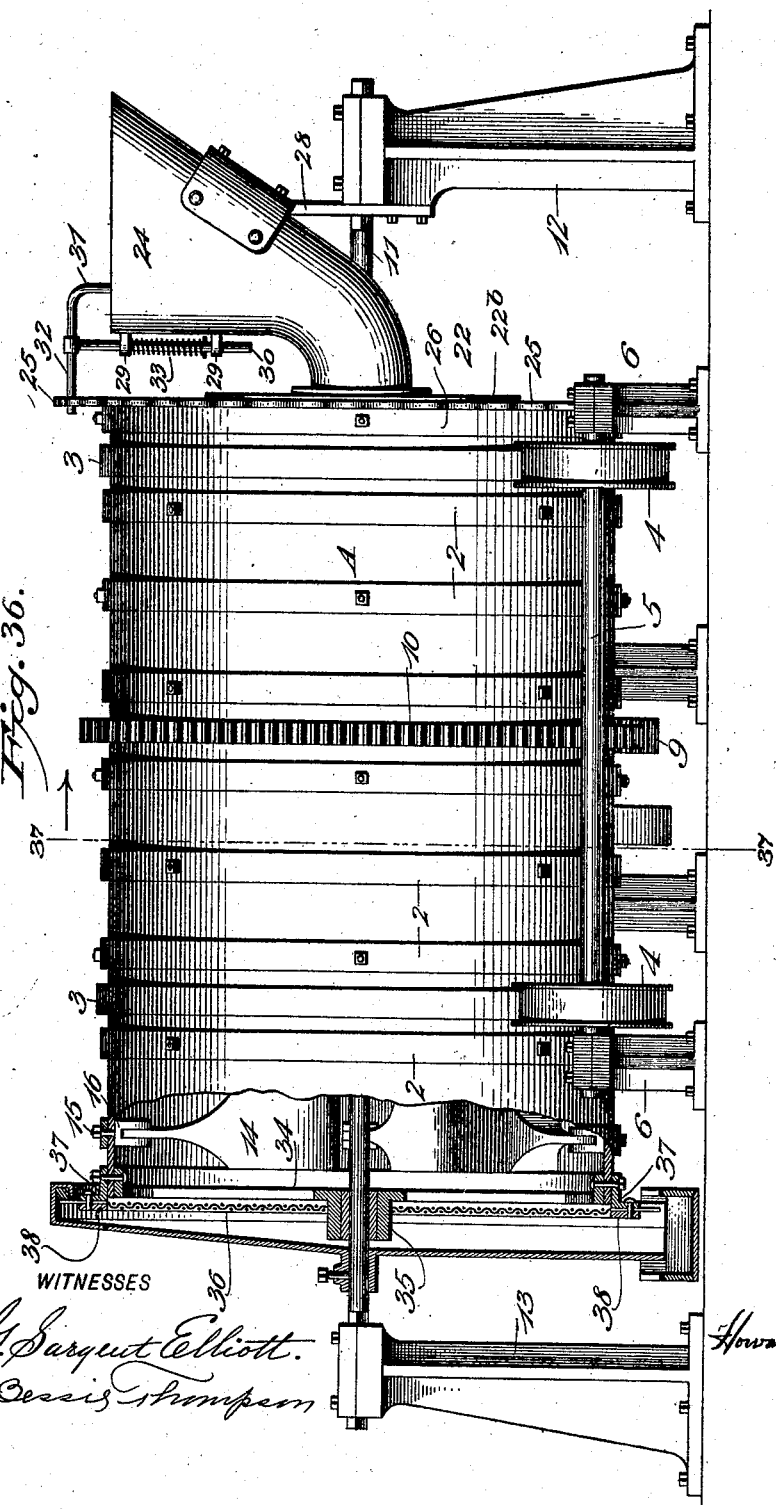
WITNESSES
INVENTOR No. 858,495. PATENTED JULY 2, 1907.
H. S. BAILEY.
ORE GRANULATOR.
APPLICATION FILED OCT. 27, 1902.
18 SHEETS—SHEET 11.
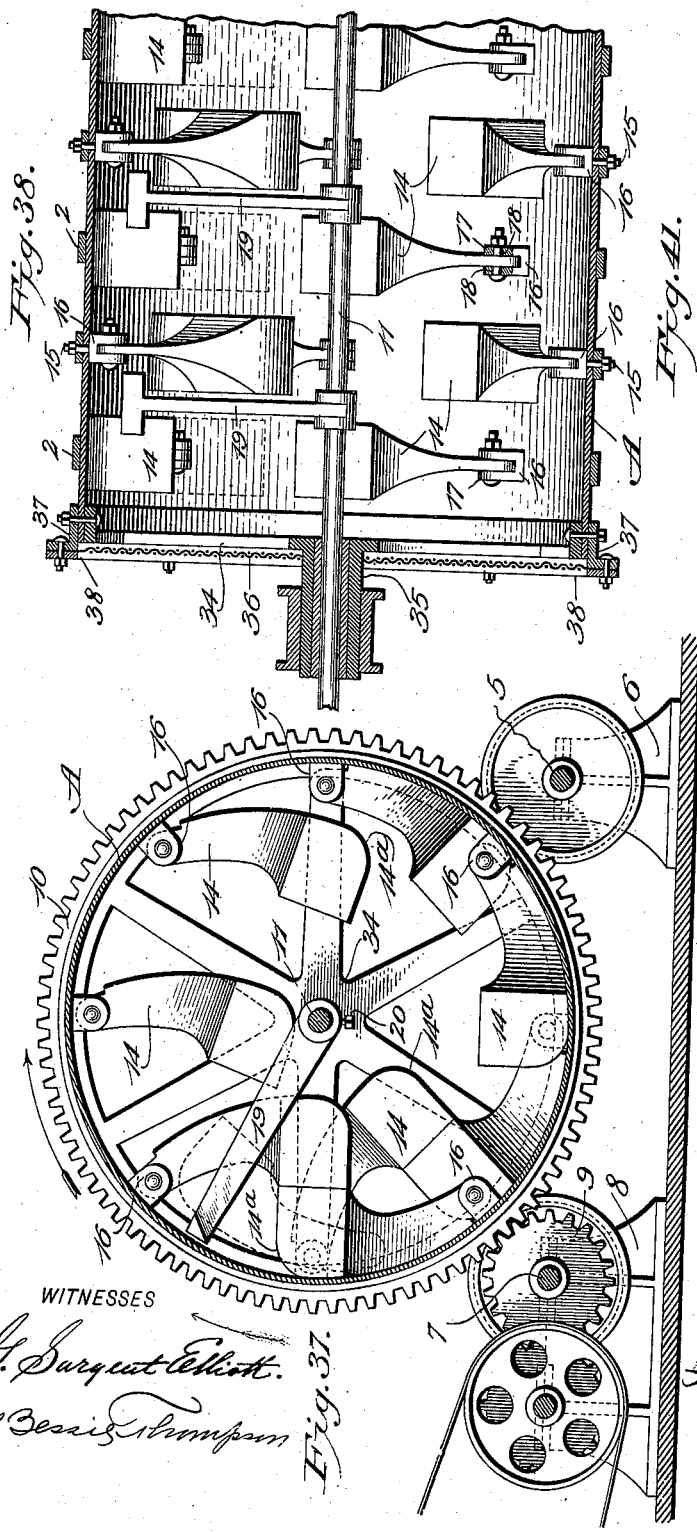

No. 858,495. PATENTED JULY 2, 1907.
H. S. BAILEY.
ORE GRANULATOR.
APPLICATION FILED OCT. 27, 1902.
18 SHEETS—SHEET 12.
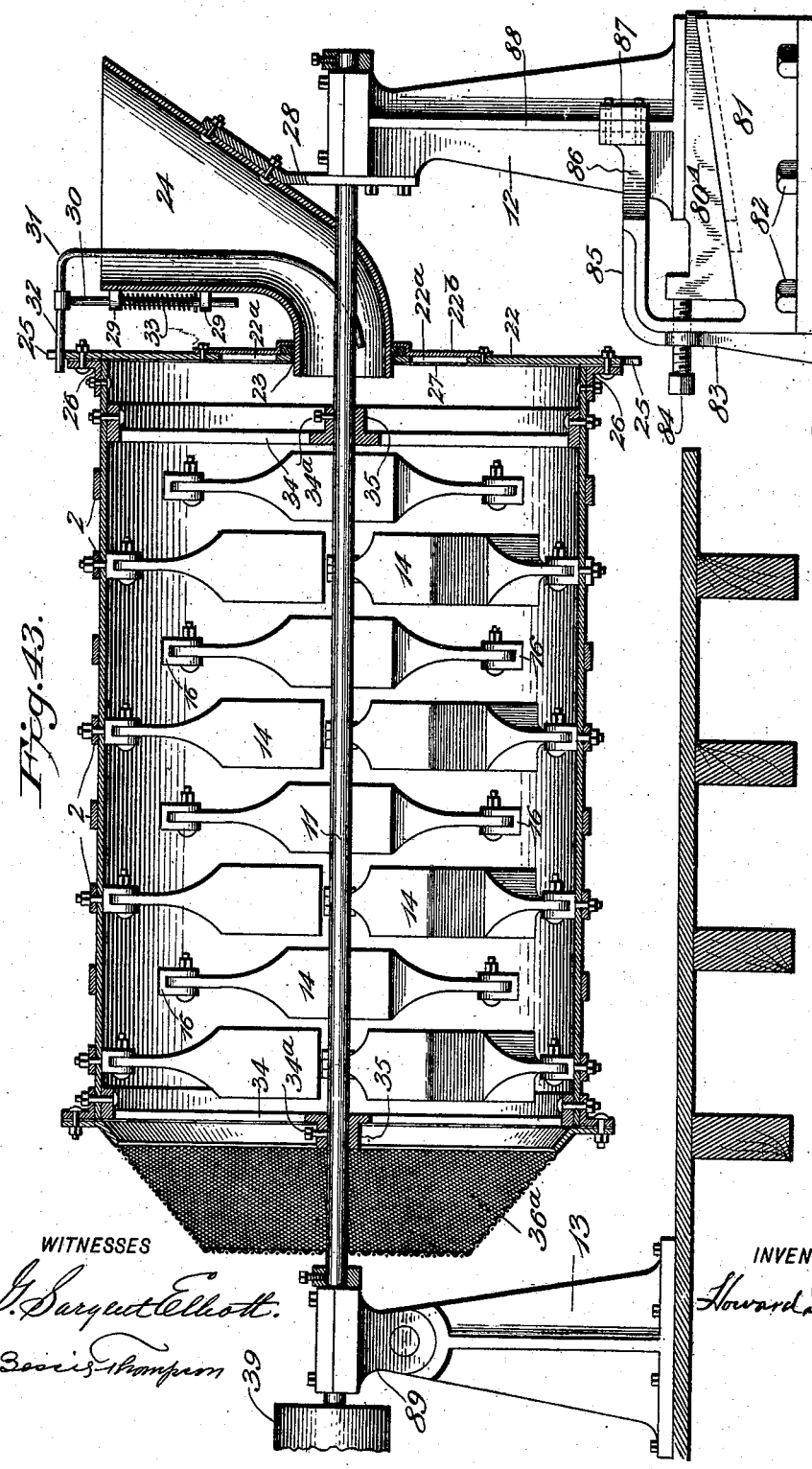

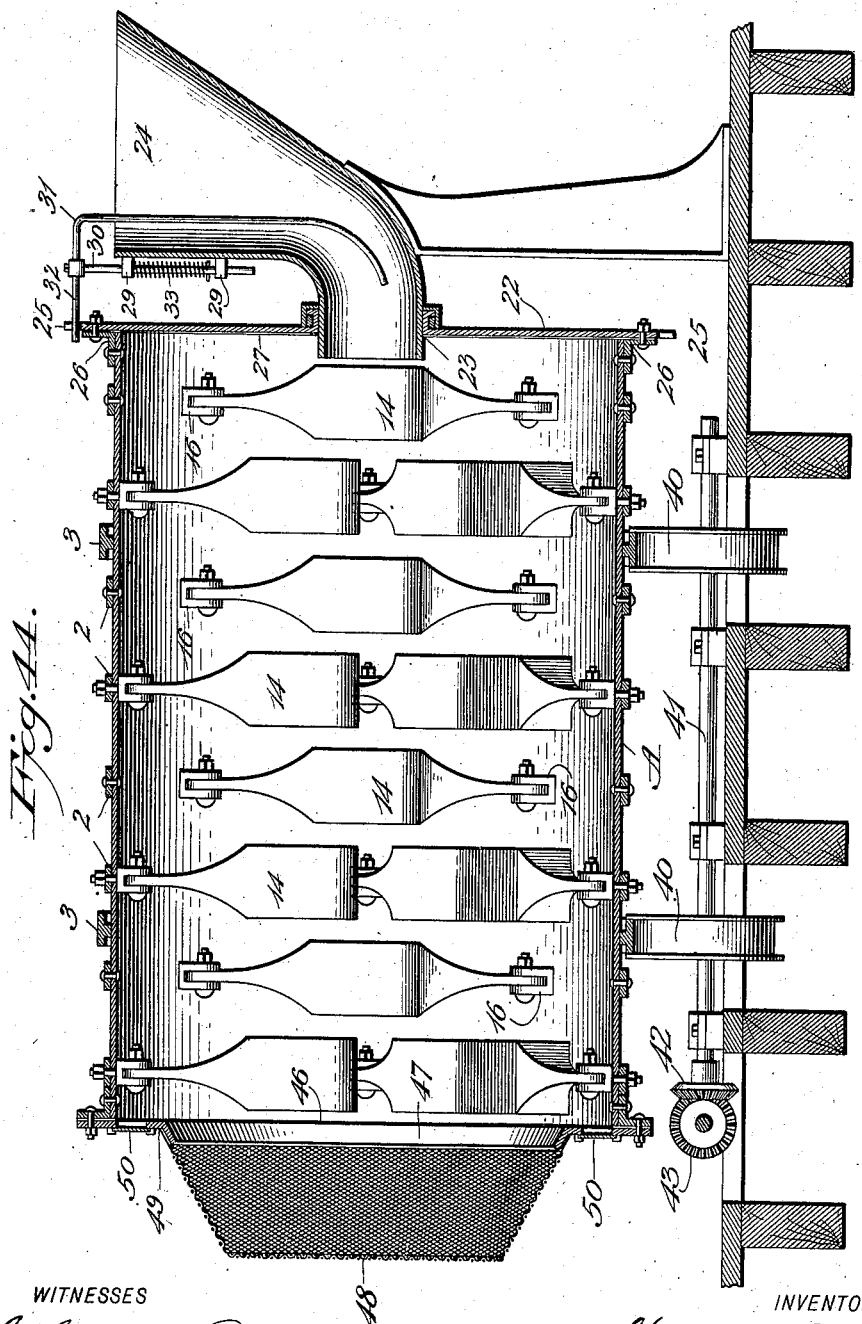

No. 858,495. PATENTED JULY 2, 1907.
H. S. BAILEY.
ORE GRANULATOR.
APPLICATION FILED OCT. 27, 1902.
18 SHEETS—SHEET 14.
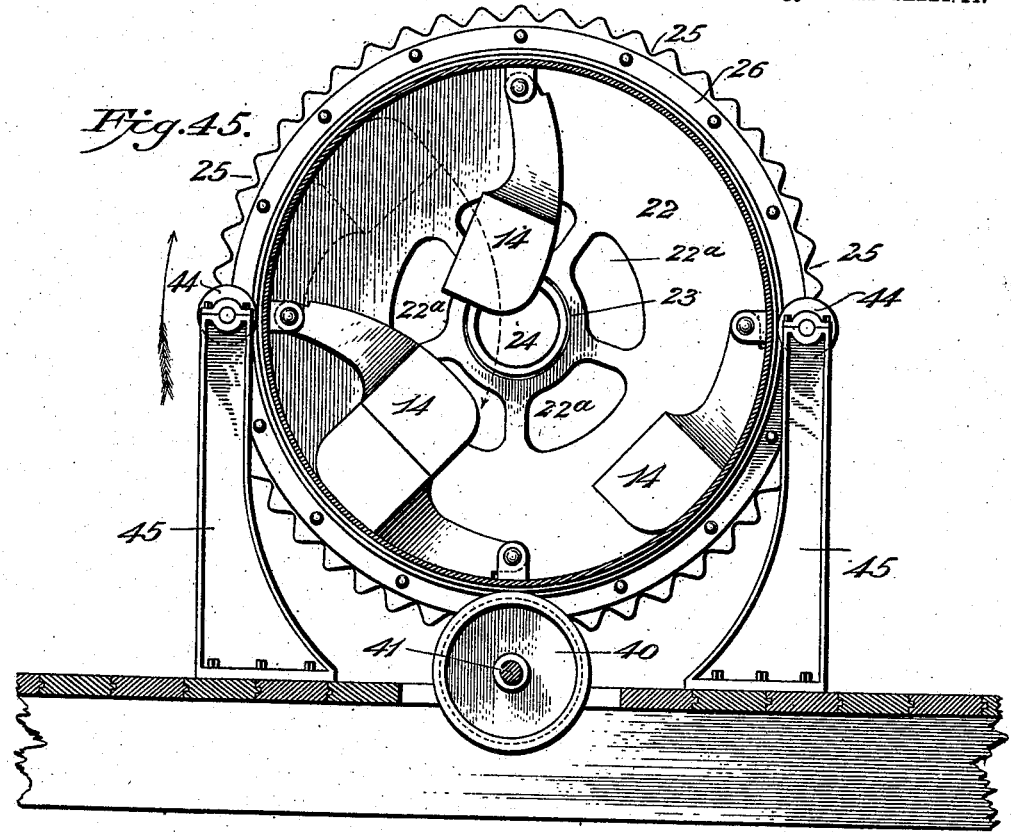
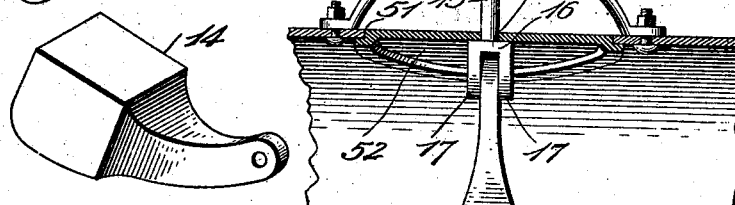
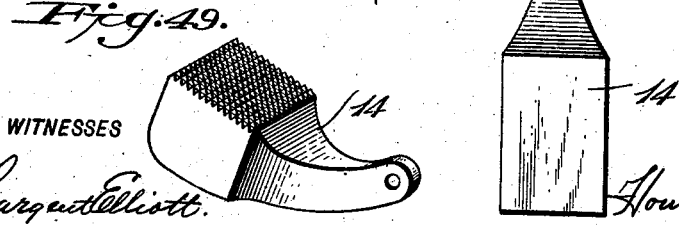
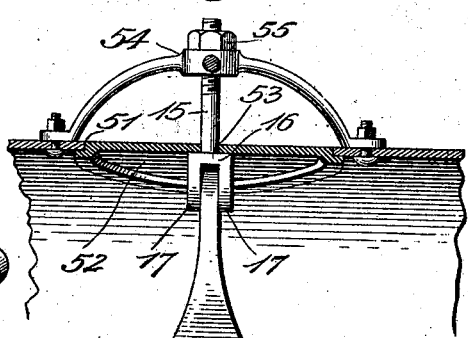
WITNESSES
INVENTOR
Howard S. Bailey.

No. 858,495. PATENTED JULY 2, 1907.
H. S. BAILEY.
ORE GRANULATOR.
APPLICATION FILED OCT. 27, 1902.
18 SHEETS—SHEET 15.
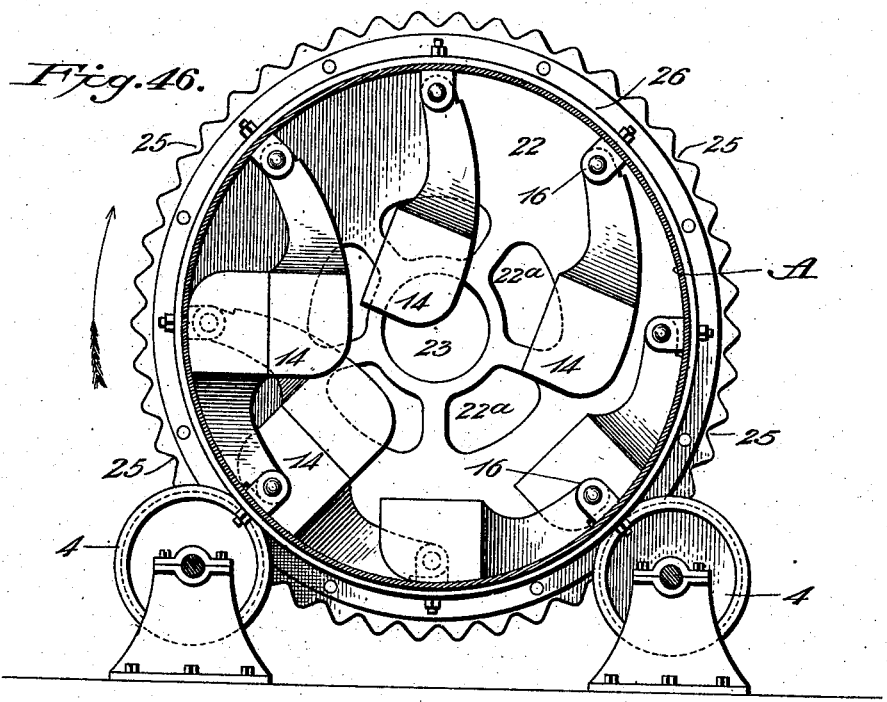
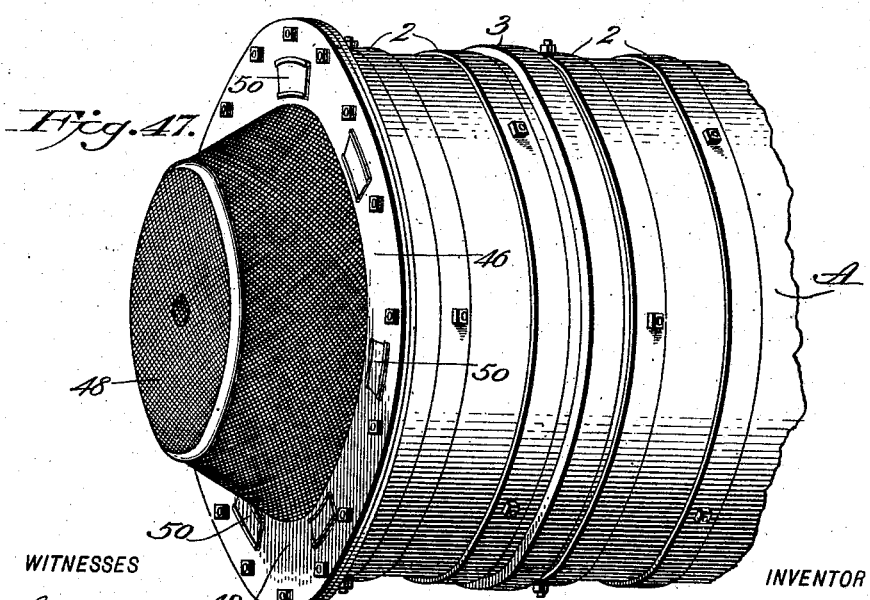
WITNESSES
INVENTOR
Howard S. Bailey No. 858,495. PATENTED JULY 2, 1907.
H. S. BAILEY.
ORE GRANULATOR.
APPLICATION FILED OCT. 27, 1902.
18 SHEETS—SHEET 18.
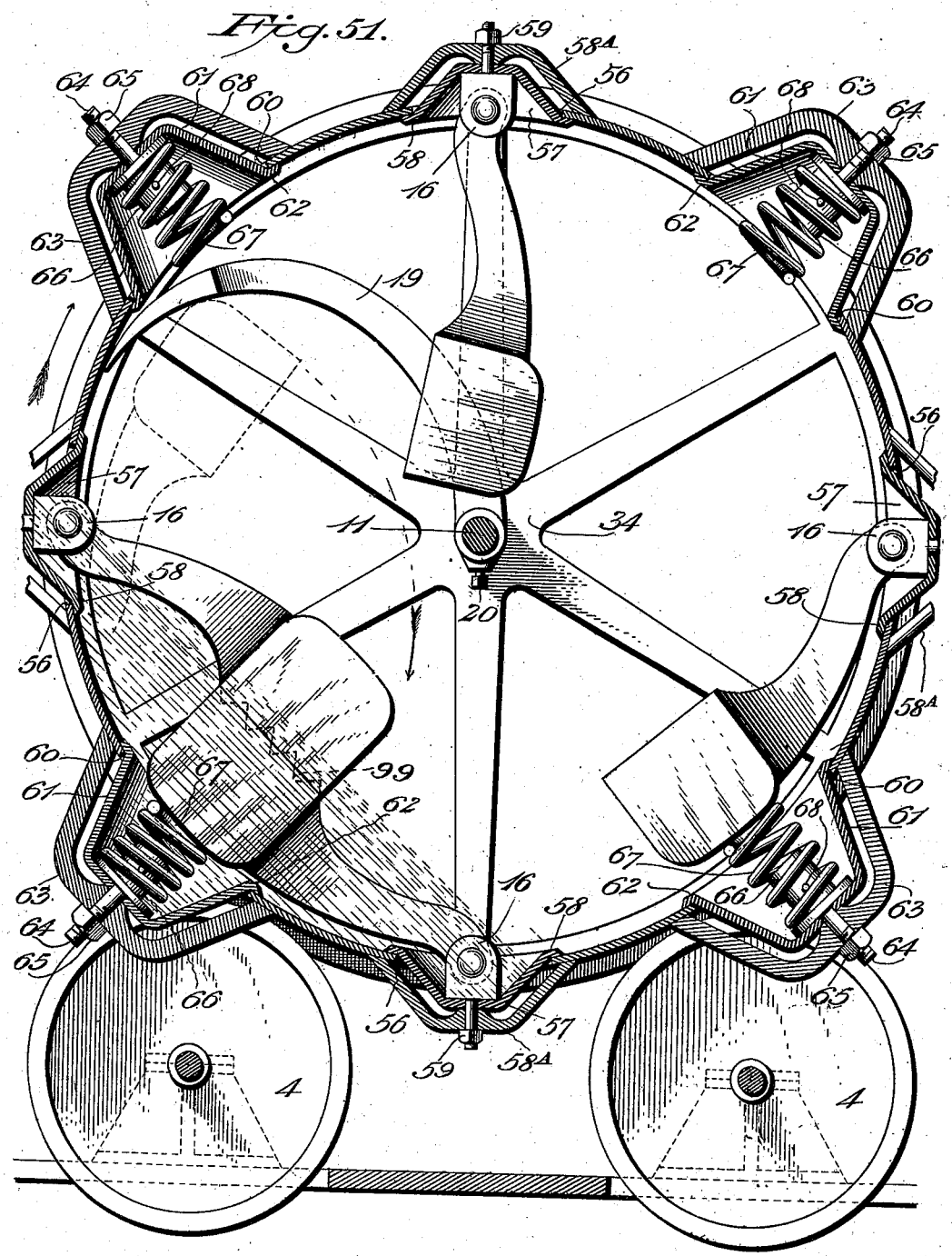
Witnesses:
Inventor:
Howard S. Bailey.

No. 858,495. PATENTED JULY 2, 1907.
H. S. BAILEY.
ORE GRANULATOR.
APPLICATION FILED OCT. 27, 1902.
18 SHEETS—SHEET 17.
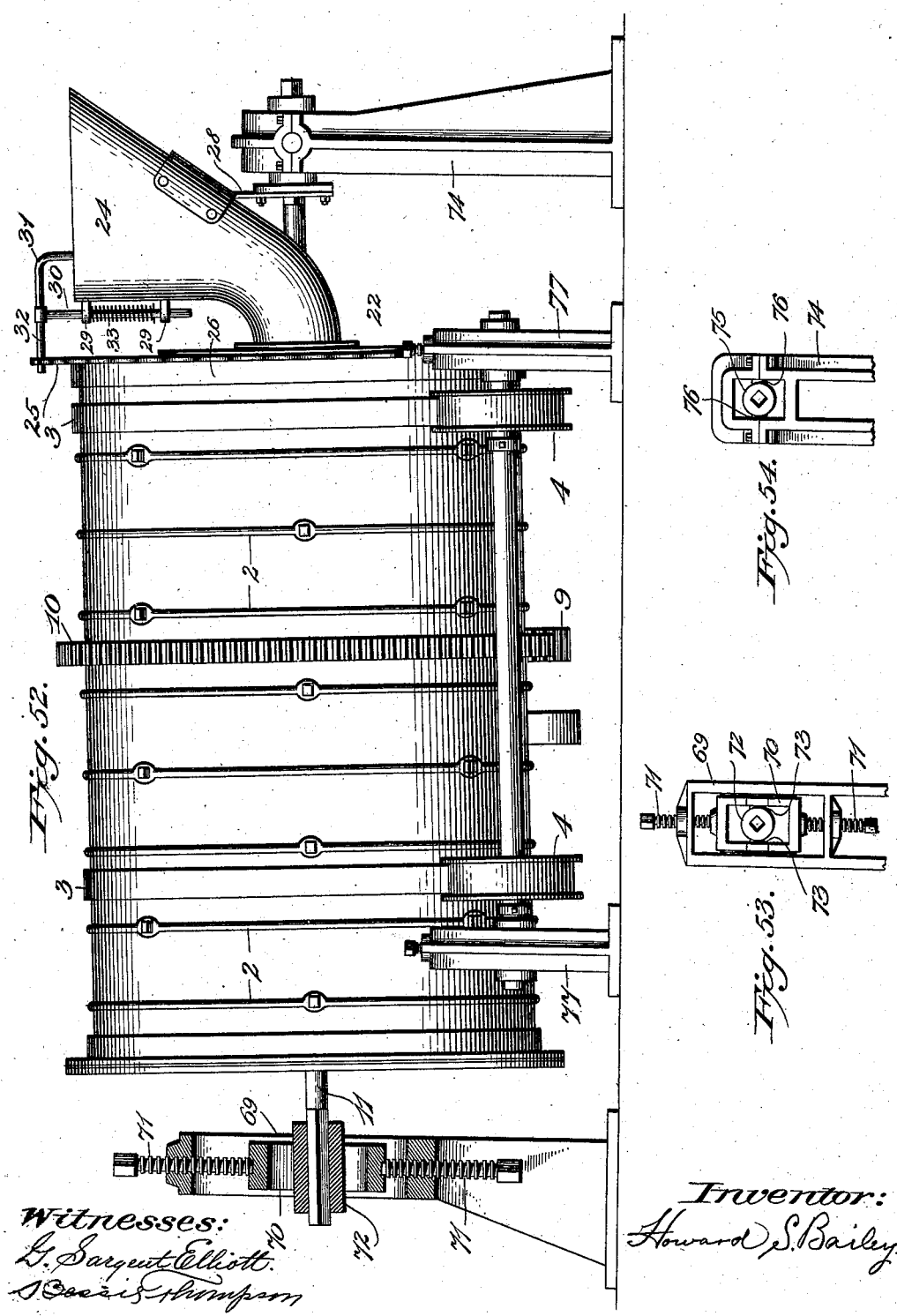

No. 858,495. PATENTED JULY 2, 1907.
H. S. BAILEY.
ORE GRANULATOR.
APPLICATION FILED OCT. 27, 1902.

18 SHEETS—SHEET 18.

Witnesses.
G. Sargent Elliott.
Bessie Thompson

Inventor:
Howard S. Bailey.

UNITED STATES PATENT OFFICE.

HOWARD S. BAILEY, OF DENVER, COLORADO, ASSIGNOR TO THE MINING MILLING AND MACHINERY MANUFACTURING COMPANY, OF DENVER, COLORADO, A CORPORATION OF COLORADO.

ORE-GRANULATOR.

No. 858,495.  Specification of Letters Patent.  Patented July 2, 1907.

Application filed October 27, 1902. Serial No. 128,958.

*To all whom it may concern:*

Be it known that I, HOWARD S. BAILEY, a citizen of the United States of America, residing at Denver, in the county of Arapahoe and State of Colorado, have invented certain new and useful Improvements in Ore-Granulators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to the granulation of ore for the purpose of reducing it to a condition in which its metallic values may be saved by concentration, amalgamation, cyanid, chlorination, roasting and leaching methods and processes of treating ores, and is applicable to all ores where a comminution of the ore is required that will afford a granulated product in contradistinction to a mashed, or ground or pulverized product which when mixed with water forms a large amount of slimes, and the objects of my invention are, first, to provide means by which a plurality of hammers may be made to strike direct, positive blows upon ore fed in operative relation to them; second, to provide an ore granulating machine in which a revoluble cylinder is arranged to receive ore and to discharge it through screened apertures; and in which a plurality of swinging drop hammers are arranged to drop as the cylinder rotates, through an arc of a circle of the inner periphery of said cylinder, into engagement with the ore received by said cylinder; third, to provide an ore granulator in which a plurality of hammers are arranged to be positively actuated to drop with a swinging blow on a body of ore temporarily confined in the cylinder and in which suitable dies are arranged to form a bed for the ore and to receive the blows of the hammers; fourth, to provide an ore granulator comprising a rotatable cylinder provided with a plurality of hammer stamps pivotally secured to the inner periphery of said cylinder and arranged to be forcibly actuated to strike an operative blow against a body of ore temporarily confined in said cylinder and to provide a suitable die surface for the ore to rest on and for the hammers to strike against, and to provide means for feeding ore into the cylinder and for sizing the discharging ore; fifth, another object of my invention is to produce a much better product for amalgamation and concentration than that produced by stamp mills, crushing rolls and Huntington mills, which in pulverizing an ore reduce a large per cent of it to powder, which when mixed with water is called slimes which easily float away with the water used in both amalgamation and concentration and carry a large per centage of the values of most ores away with them, while in my invention the particles of ore are broken into a granular or cubical form and no matter to how fine a mesh the ore may be granulated the amount of powdered ore called slimes will be so small as to not interfere with a most satisfactory recovery of the mineral values by either concentration or amalgamation, and the particles of native gold and other metals which under action of the heavy stamps or powerful rolls now in general use are mashed into exceedingly small, thin sheets and float away with the slimes, and are saved when the ore is properly granulated by reason of their granular and cubical forms and consequent greater specific gravity; sixth, a further object of my invention is to produce a machine which can be more cheaply constructed than the common type of stamp mills, crushing rolls, Huntington mills, etc. now in use, and which, at the same time can be more cheaply operated and kept in repair, and seventh; to provide a granulating machine that will granulate a given amount of ore at less expense in power and in wear of parts than the pulverizing machines in use. I attain these objects by the mechanism illustrated in the accompanying drawings, in which,—

Figure 2:
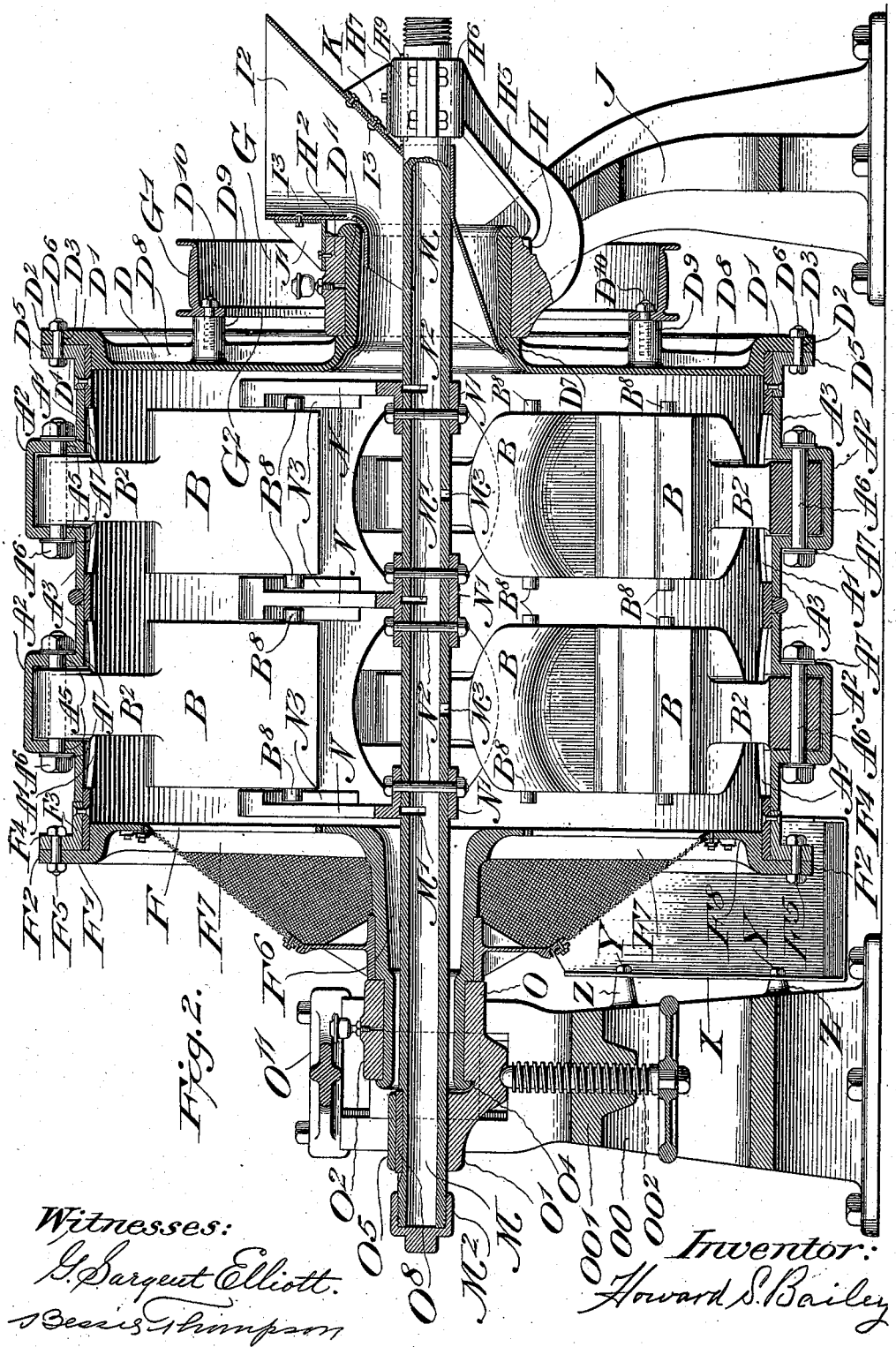
Figure 55:
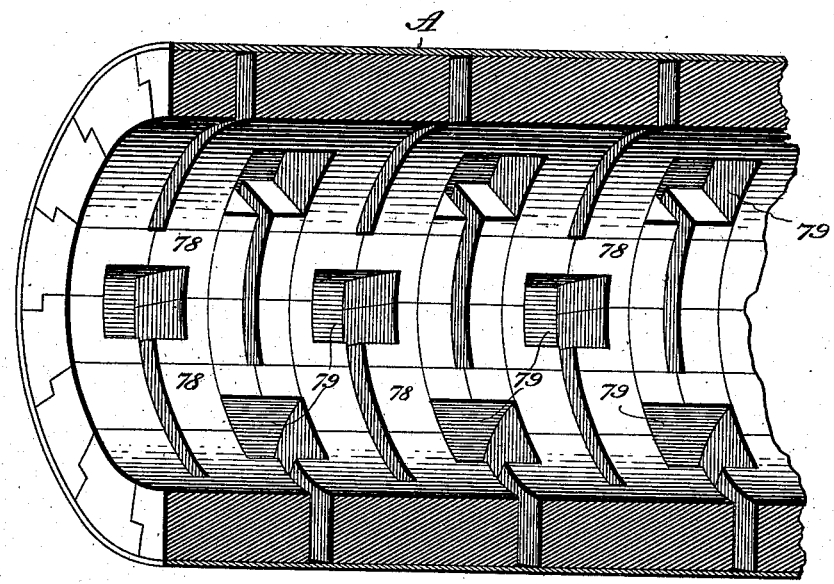
Figure 56:
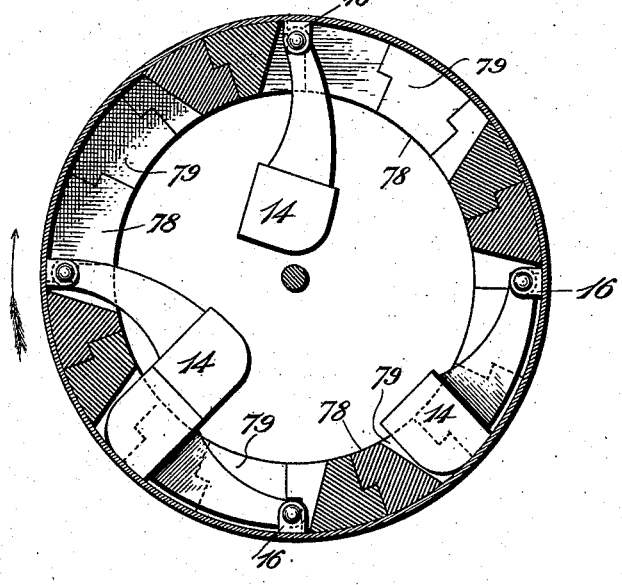

Figure 1 is a plan view of my preferred form of granulator, the same being arranged for two sets of hammers. Fig. 2 is a vertical, longitudinal sectional view thereof. Fig. 3 is a vertical, transverse, sectional view of the same. Fig. 4 is an elevation of the discharge end of the granulator, the adjustable bearing being shown in section. Fig. 5 is an elevation of the feed end of the granulator. Fig. 6 is a perspective view of the bearing for the feed end of the granulator. Fig. 7 is a perspective view of the bearing for the discharge end thereof. Fig. 8 is a perspective view of one of the caps for the bearings 6 and 7. Fig. 9 is a plan view, partly in section of the bearing at the discharge end of the granulator showing the manner of supporting the end of the granulator, and the stationary shaft which passes therethrough. Fig. 10 is a side elevation of the same showing the vertically movable blocks in which the journals of the bearing rest. Fig. 11 is a sectional view of one of the arms which force the hammers to drop at the proper time, and through which water is introduced to the interior of the cylinder when it is desired to granulate the ore wet. Fig. 12 is a transverse section of the same taken on the line 12—12 of Fig. 11. Fig. 13 is a perspective view of one of the dies upon which the hammers fall. Fig. 14 is a transverse sectional view of a form of granulator in which the hammers are arranged to overlap and strike one on top of the other in their order of rotation, the stamping face of one hammer forming a die or shoe for the hammer next ahead of it in direction of rotation, the handles of the hammers being pivotally secured to the hammers in the view and the stamping faces of the hammers being stepped and inclined toward the upward rotating side of the cylinder. Fig. 15, is a perspective view of the form of hammer shown in Fig. 14. Fig. 16 is an end elevation of the discharge end of the granulator showing the screen holding frame and the preferred manner of removably securing the screens to the discharge end of the cylinder. Fig. 17 is a sectional elevation of Fig. 16 showing the cylinder head at the discharge end of the cylinder and the screen holding frame in section. Fig. 18 is a plan view of the ring used to clamp the screens in the screen frame. Fig. 19 is a sectional elevation of Fig. 18. Fig. 20 is a section on the line A of Figs. 16 and 17. Fig. 21 is a perspective sectional view on line B of Fig. 16. Fig. 22 is a vertical, sectional side elevation of my invention containing but one set of hammers and illustrates the granulator adapted to amalgamate by the placing of a small body of mercury in the cylinder to catch by amalgamation with the mercury any gold or silver that may be in condition for amalgamation in ore that may be granulated and shows the die or die plate provided with grooves either in the die or in the ore guide-plate and adapted to direct any mercury that may be carried up the upwardly moving side of the cylinder as it rotates away from the striking face of the die and to the opposite sides of the die into a channel between the die and the head ends of the cylinder. Fig. 23 is a fragmentary end sectional view of Fig. 22 but shows the grooves in the ore guide plate instead of in the die. Fig. 24 is an enlarged fragmentary view of the die showing the mercury grooves in the die. Fig. 25 is a sectional view of a hammer and its handle showing the handle connected to the hammer by a universal joint. Fig. 26 is a plan view of the handle and hammer shown in Fig. 24. Fig. 27 is a bottom plan view of the cap that secures the top of the ball of the handle in the ball socket of the hammer. Fig. 28 is a section of Figs. 26 on line C O. Fig. 29 is a fragmentary sectional view of a cylinder showing the hammers provided with flexible or yielding handles, one of the handles of this comprising a coiled spring and the other a spring blade also showing the adjustability of the arm that forces the hammer to strike its blows at any predetermined part of the ore bed holding portion of the cylinder. Fig. 30 is a perspective view of the flexible or yielding handle shown in Fig. 29 and comprises a spring blade. Fig. 31 is a perspective view of a hammer showing a removable and a renewable ore granulating shoe secured to it. Fig. 32 is a plan view of a shoe showing a handle pivotally secured to it. Fig. 33 is a section of Fig. 32 on line D O, of Fig. 32, showing the rivet in dotted lines that secures the shoe to the hammer in Figs. 30 and 31. Fig. 34 illustrates a pivotal connection of a hammer to the head of the cylinder. Fig. 35 is a sectional view of the cylinder showing the adjustable reinforcement hoops. Fig. 36 is a side elevation of a modified form of granulator, a part of the casing at one end thereof being broken away, and means being shown for supporting and revolving the same. Fig. 37 is a transverse, vertical sectional view taken on the line 37—37 of Fig. 36, looking in the direction of the arrow. Fig. 38 is a longitudinal, sectional view of a portion of the cylinder taken on a horizontal plane, showing the arms for insuring the drop of the hammers, positioned so that each one will lie between two sets of hammers. Fig. 39 is a perspective view of one of the aforesaid arms. Fig. 40 is a slight modification of the same showing the arm curved. Figs. 41 and 42 illustrate a plan and side elevation respectively, of a further modification of the arm, in which the free end is provided with antifriction rollers. Fig. 43 is a vertical, longitudinal sectional view of another form of the revoluble granulator, in which the same is secured to a shaft which is revolved in any suitable manner. Fig. 44 is a vertical, longitudinal sectional view of still another form of granulator, in which the same is supported and revolved by friction rollers. Fig. 45 is a vertical, transverse sectional view of the form of granulator shown in Fig. 44, one set of hammers only, being shown. Fig. 46 is a view similar to Fig. 45 showing another manner of supporting the cylinder. Fig. 47 is a perspective view of the discharge end of the cylinder, the cap plate thereof being supplied with doors. Fig. 48 is a perspective view of one of the hammers. Fig. 49 is a perspective view of a modified form of hammer, the face thereof being roughened or serrated. Fig. 50 is a view illustrating a hammer suspended from a spider or bracket without the cylinder which straddles a manhole through which the said hammer may be withdrawn. Fig. 51 is a view illustrating a form of cylinder in which the inner periphery is provided at intervals, with stout helical springs which are seated in housings and receive the impact from the blow of the hammers. Fig. 52 is a side elevation partly in section, illustrating a manner of supporting the granulator so that the same may be tilted or set at an incline where desired. Fig. 53 is a front elevation of an adjustable bearing which is used at the discharge end of the granulator, and for the supporting rollers. Fig. 54 is a front elevation of an adjustable bearing used to the feed end of the granulator, and Figs. 55 and 56 illustrate respectively, a sectional perspective view, and a transverse, sectional view of a form of cylinder having a lining made up of blocks of chilled cast steel, of any suitable analogous material.

Referring to the accompanying drawings:—The letter A indicates a cylinder of suitable dimensions, which is constructed of iron or steel, and is revolubly supported at each end, in adjustable bearings, as will be hereinafter fully set forth.

My ore granulator can be made of various sizes and capacities and the granulators may contain from one set of hammers for a five- to ten-ton capacity machine per day of 24 hours to enough sets of hammers to make machines of 25 and 50 and 100 tons or more capacity per day. The diameter of the cylinder varying from three and a half for the smallest size machine to twelve or more feet for the largest, the length of the cylinder of each machine being governed by the granulating capacity desired.

In Fig. 1 I illustrate a cylinder provided with 2 sets of hammer stamps which would make a machine of three feet and a half in diameter, of from 8 to 12 ton capacity per 24 hours and of larger capacity if the diameter is increased.

In Fig. 22 a granulator is shown containing but one set of hammers, which if 3½ feet in diameter would produce from four to eight tons of granulated product, while the other views show machine of much larger capacity. The cylinder A of my granulator is preferably constructed of heavy boiler iron or steel plates securely riveted together, as shown. In the preferred constructions shown in Figs. 1 2, 3, 4, 5, 14, 22, 23 and 29 the cylinder A is provided with hammer ingress and egress apertures $A^1$ which are arranged at equal distances apart and they are preferably arranged in circumferential planes which may be arranged parallel with one another or in alternate order or in spiral order in machines having a plurality of sets of hammers. I preferably place four of these apertures in each circumferential plane although my invention contemplates any number. A hood $A^2$ is fitted to cover each one of these apertures and each hood is provided with a flange $A^3$ which overlaps the edges of the apertures and is securely bolted to the cylinder by bolts $A^4$. The hood $A^2$ comprises a radially projecting, long narrow shell portion which is arranged with its long sides parallel with the circumference of the cylinder. Through the long sides of the hood bolt holes $A^5$ are formed which are arranged substantially parallel with the axis of the cylinder. Bolts $A^6$ are inserted in these holes and compressible washers $A^7$ which preferably consist of a lead disk covered with copper are placed between the heads and nuts of the bolt against the sides of the hood in order to insure a water tight joint. Such a washer is in common use and does not form any part of my invention. These bolts form the pivotal fastening points of the hammers and the apertures in the cylinder through which I preferably insert and remove the hammers in all those machines in which the diameter of the cylinder is below six to eight feet. The hammers are preferably pivoted in these hoods beyond the periphery of the cylinder in the smaller diameter of cylinder as it permits the hammers to occupy a more vertical position at that part of the cylinder where they drop on to the ore bed at the bottom of the cylinder.

In cylinders of large diameter where the hammers are very heavy the apertures may if desired be dispensed with and the hammers if desired can be pivotally secured directly to the periphery of the cylinder as shown in some of the accompanying illustrations as the arc of that portion of the cylinder in which the hammers drop is much straighter in a cylinder of large diameter than in a small one. The hammers B comprise a block-shaped portion which I will designate hereafter as a hammer stamp, and a handle portion. The hammer stamp portion is made of the best material used in the art of reducing rock and ores and may be used directly on the ore until they wear away enough to warrant their displacement by new ones or if desired they may be provided with renewable and removable wearing shoes $B^1$ as shown in Fig. 31. The handles $B^2$ may also be made as an integral part of the hammer stamps or may be a separate piece from them and may be secured in any desired way to them. The handle $B^2$ of each stamp may also be a rigid handle or a flexible handle as shown in Fig. 29 depending largely on the character of the ore or rock and capacity of the machine; thus in Figs. 1, 3, 22, the handles are shown as an integral portion of the hammer stamp, while in Figs. 14, 23, 29, they are independent elements and are pivotally secured to the hammer stamps.

The flexible handles are made preferably of a coiled spring $B^0$, or of a flexible blade $B^{00}$ as shown in Figs. 29 and 30. The flexible handles are connected to the hammer stamps in any suitable manner. The free end of the handle of each hammer stamp is pivotally mounted on the bolt of each hood, and consequently when they drop they swing down through an arc of the circle of the inner periphery of the cylinder from a vertical position in the cylinder against the cylinder's shell to a depending position relative to their pivotal center. Each hammer is preferably provided with a short lug $B^8$, on its opposite sides which are used to enable the hammer stamps to be positively thrown down at each revolution of the cylinder as will be more fully explained hereinafter. Each hammer stamp may be of a length equal to substantially one-half the distance between its pivotal point and the pivotal point of the hammer stamp, or they may be of sufficient length to over-lap and register and strike directly on top of each other when in operative relation, as shown in Figs. 14, 23 and 29 in their rotative order and as the cylinder revolves the hammers will assume the several positions shown in Figs. 3, and 14.

E, designates die blocks, which in case the hammer stamps do not over-lap, are secured to the inner periphery of the cylinder at equidistant points and in positions to receive the blow from each descending hammer stamp. The hammers may be of sizes that will weigh from 50 to 500 lbs. apiece, but as a large number of light blows are desired rather than a few heavy ones per minute, hammers weighing from 100 to 250 pounds are preferred, the weight depending largely on the diameter and rotative speed of the cylinder and also somewhat on the brittleness and cleavage of the ore. The faces of the dies are stepped similar to those of the hammers in order that they may register with them. See Fig. 3. But where the hammer stamps overlap and strike one on top of the other as shown in Fig. 14, one hammer forms a die for the hammer preceding it in their order of rotation and an ore guide block $E^1$ is secured by suitable rivets or bolts $E^2$ to the shell of the cylinder to guide the ore from the sides of the cylinder on to the top of the hammers lying against the shell of the cylinder and acting as dies for the hammer preceding it. The dies and also the guide block are naturally of tapering form and incline from the stamping face of the hammers to the end surface of the hoods, so that the ore that fills them as the cylinder rotates will run from them over the die or ore guide block onto the stamping face of the die.

While the fixed stationary dies and the ore guide blocks may be bolted in to the cylinder in any convenient manner, they are preferably secured in a T slot E—3 formed in the bottom part of the dies, see Figs. 3, 22 and 24, from which the bolts $E^2$ pass through and are bolted to the cylinder. These T-slots permit of the adjustment of the dies relative to the falling hammers better than through bolts. It will be seen by reference to Fig. 3, that when a hammer is in the position where it lays against the inner periphery of the cylinder its outer end lies close to the free end of the die E, and as the hammer is thicker than the die it extends above it, thus forming a wall or abutment at the end of the die. Now, as the cylinder revolves in the direction of the arrow, the bed of ore AA which lies at the bottom thereof, will naturally assume an inclined position, the amount of inclination of which will depend on the rotative speed of the cylinder, as indicated by the dotted lines $AA^1$ in Fig. 3, which designates the bed of ore, or ore and water depending whether dry or wet crushing is desired, and as the dies pass through the ore, the steps formed therein, and the walls or abutments formed by the ends of the hammers projecting above the dies will collect and momentarily hold a portion of the ore which will be struck by the descending hammers.

The cylinder A is provided at its feed end with a cylinder head D, which I term the front cylinder head, and at its discharge end with a head F, which I term its rear cylinder head. The front cylinder head D extends preferably slightly within the cylinder and is provided with a circumferential flange D—1, which lies against the outer end of the cylinder, and which is provided at intervals, with ears or projections D—2, which are provided with bolt holes D—3. A band ring D—4 is riveted to the cylinder at this end and is provided with ears D—5 which are provided with bolt holes that register with the holes in the ears D—2. The ears of the band-ring and the ears of the cylinder head are bolted together by bolts $D^6$. The cylinder head D is thus strongly bolted to the end of the cylinder. This cylinder head D is also provided with an axially arranged, outwardly extending hollow trunnion $D^7$, which forms a bearing for this end of the cylinder. Supporting ribs $D^8$ also extend from the trunnion to the outer rim of the cylinder head. These ribs serve to strengthen the flange portion of the head. Each rib is provided with a boss $D^9$ at a concentric distance from the axis of the trunnion and to these bosses a suitably constructed pulley G is secured by bolts $D^{10}$. The pulley G is a rim pulley, the rim of which surrounds the trunnion end of the cylinder head D, and consists of the rim G—1 with an introverted flange portion G—2 that is bolted to the bosses by the bolts $D^{10}$. The pulley is thus secured to this cylinder head. The trunnion is provided with a bearing $D^{11}$, which is mounted in a box H, which, as shown in Fig. 6, is provided at each side with a laterally extending trunnion which is seated in journal boxes I and I—1 that are formed on the top of a yoke shaped pedestal J that supports the feed end of the cylinder. A removable cap, $H^2$ is secured to the box H by suitable bolts H—1. An arm H—5 is formed integral with the box H and extends rearward and upward, and is provided at its end with a box H—6, having a cap H—7, which is provided with two or more key-ways H—8. The axial center of box H—6 is in alinement with that of box H. The box H—6 supports one end of a hollow shaft or of an extra heavy piece of tubing M. A key $H^9$ is secured in the shaft and fits the keyway $H^8$ in the cap. Two or more key-ways are preferably provided in order that the shaft may be secured in two or more predetermined positions. The shaft M extends centrally through the cylinder and is rigidly keyed in a bearing at its opposite end as will be hereinafter shown.

A hopper $I^2$ is positioned at the end of the cylinder in such a manner that its throat portion enters the hollow trunnion of the front cylinder head, the shaft M passing through the said throat, as shown. The upper portion, or mouth of the hopper is bolted by bolts $I^3$ to the caps of the trunnions and shaft bearing boxes by angle-plates J and K, thus rigidly securing the hopper in position to discharge the pieces of ore as they come from a rock breaker into the interior of the cylinder.

The shaft M of Fig. 1 between the cylinder heads D and F is provided with arms N, which I term hammer actuating arms, which are preferably made hollow, and are of the form shown most clearly in Figs. 3, 11 and 12. These arms are positioned to lie, one between the two sets of hammers B, and one at each end of the cylinder adjacent to a set of hammers, three arms being shown in this view.

The arms N are provided at their inner ends with hubs N—1 which surround the shaft and are rigidly bolted thereto by bolts N—2. The outer ends of the arms are provided with laterally extending flukes N—3 which engage either the top edges of the sides or the lugs B—8 on the sides of the hammers as the cylinder revolves. These flukes swing the hammers from the inner surface of the cylinder towards its center. As the hammers move upwards they follow the curve of the flukes and then fall heavily upon the shoes. These flukes positively start each hammer downwardly at the point to secure the most effective blow. It is important that some such positive means be empolyed to cause all the hammers to strike their blows at the same point, where they will deliver the most effective blow on the layers of ore over the shoes, since the constant presence of finely pulverized ore around the pivotal bearings of the hammer arms will at times cause them to stick and they would then be apt to be carried too high in the cylinder before falling. In other words, the ore bed would be carried too far up by the cylinder before the hammers fell. These hammer actuating arms may be made straight or curved as shown but are preferably curved.

The rear cylinder head F is provided with an annular rim, which like that on the head D extends slightly within the cylinder, and is provided with a circumferential flange F—1, which lies against the outer end of the cylinder, and which is provided at intervals with ears or projections F—2, which are provided with bolt holes. A band F—3 is riveted to the cylinder at this end and is provided with ears F—4 having bolt holes which register with the holes in the ears or projections F—2, formed on the circumferential flange F—1. Bolts F—5 pass through the ears of the band and of the cylinder and thus secure the head F to the cylinder, as shown. The head F is provided centrally with an outward extending hollow trunnion F—6, and at intervals with ribs or spokes F—7 which extend from the trunnion F—6 to the outer rim of the head. The rear cylinder head F is formed with open spaces between the spokes and extending from near the outer rim to near the hollow trunnion, thus forming an introverted flange portion F—8 at its outer peripheral portion, the object of which is to inclose the end of the cylinder deep enough to keep a bed of ore at a suitable depth over the dies. The hollow trunnion of the rear cylinder head is journaled in a box O, which is a part of the box O—1, these two boxes being preferably formed in one casting. The box O—1 supports the rear end of the shaft M. These boxes are adjustably supported by the pedestal OO. The boxes O and O—1 are in axial alinement with the boxes H and H—6 at the opposite end of the cylinder; consequently the shaft M and the cylinder are in substantial axial alinement. The shaft however, is held stationary while the cylinder revolves on the bearings of its trunnions. The box O is provided with a semi-circular cap O—2, which is secured by bolts O—3 to the box. The trunnion of the rear cylinder head is reduced in diameter to form a shouldered bearing for the box which together with the shouldered bearing at the opposite end of the cylinder, prevents endwise movement of the cylinder in its bearing boxes. A recess O—4 is formed at the end of the box O to allow room for the shoulder at the extremity of the box O, as shown.

The box O—1 is provided with a cap O—5 which is provided with key-ways O—7 and a key O—8 is fitted in the shaft and is fitted in one of the key-ways of the cap of the box. These keys are employed at each end of the shaft in its boxes and holds the shaft rigidly against rotative movement. As the hammer actuating arms are rigidly secured to the shaft they are fixed in a predetermined position by keying the shaft to its bearing boxes and as the position of the arms defines the point at which the hammer will drop, two or more keyways are provided in the boxes so that the hammers may be made to drop at either one of two or more points in the bed of ore. Thus; if it is desired to have the hammers strike directly at the bottom of the cylinder the shaft would be keyed in the lowest keyway in the cap of the shaft's boxes, which would be substantially at the point of the line ooo, on the dotted arm oo, in Fig. 29. The hammer stamps would then strike at substantially the position of the die hammer shown in full lines at the bottom of the cylinder in Fig. 28.

If it is desired to have the hammer stamps strike the ore bed just to one side of the bottom of the cylinder or at a point where the inclination of the ore bed under a medium speed of from 40 to 60 revolutions per minute of the cylinder which is the position of the hammers in Fig. 29, the shaft should be keyed to its boxes at substantially the position of the dotted line ooo and arm oo. But if the cylinder is rotated at a speed of from about 50 to 100 revolutions per minute the arms should stand at substantially the position of the dotted arm OZ, and the key in the position OY in Fig. 29, which is also the position of the hammer actuating arms in Figs. 3, 14 and 51.

The box O is provided on its opposite sides with projecting trunnions O—9. These trunnions are journaled in boxes P, which slide vertically in a guideway O—10 formed in the ends of a yoke portion which forms the upper terminal end of the pedestal OO, a cross shaped cap O$^{11}$ is removably secured to the top of each slideway of the yoke and extends also across the yoke thus bending the ends of the yoke and of the slide-ways together. The pedestal O O is provided below its yoke end with a cross-bar OO$^1$ to the center of which a screw OO$^2$ is threaded. This screw extends above the cross-bar and its upper end is fitted to bear in a recess formed in the bottom of the boxes O and O—1. A hand wheel is secured to the lower end of the screw below the cross-bar to turn the screw and raises or lowers the boxes O and O—1 in the slide-ways of the pedestal and consequently raises or lowers the discharge end of the cylinder above or below a horizontal center, the box H at the opposite end of the cylinder pivotally turning on its trunnions in the boxes of the pedestal at the head end as the discharge end is raised or lowered above a horizontal plane. On the trunnion of the rear cylinder head adjacent to the box O, a screen frame is removably clamped. This screen frame comprises a divided disk, the two halves of which are arranged to be clamped together around the trunnion hub by bolts Q—1, see Fig. 16. Each half of the disk is provided with an angular projecting spider frame portion that extends to and is bolted by bolts Q—2 to the peripheral portion of the rear cylinder head. This spider frame is composed of the arms Q—3 and the peripheral rim Q—4 which are arranged to form a triangular shaped screen space between each pair of arms and the peripheral web and the disk. A narrow rabbeted or stepped edge is formed all around the edge of the arms, and web and edge of disk and a screen R the size and shape of this triangular space is formed to rest on the stepped or rabbeted edge, see Figs. 16—21. A triangular ring or frame S which is also arranged to fit the rabbeted edge is laid around the edges of the screen and is secured to it by bolts or screws T. While I preferably show six screens in the frame either 3 or 4 or more may be employed. But while I preferably screen the granulated product as it is discharged from my ore granulator yet it can be readily seen that this function is not an essential element of my granulator as the granulated ore can be discharged from the machine and then be screened independent of it.

U, designates reinforcement hoops surrounding the cylinder at suitable intervals apart along its length. These hoops may be rigidly fixed to the cylinder as shown in Figs. 36, 38, 43, 44, 47 and 52 or they may be adjustable as shown in Figs. 1 and 2 and 35. X designates a discharge end and screen incasing hood and chute which is secured preferably by bolts Y to lugs Z that are formed on the adjacent edge of the pedestal OO, and is arranged to incase the greater part of the circumference of the discharge end of the cylinder to prevent water and the fine particles of granulated ore from being thrown off by the revolving cylinder and to convey the discharged granulated material to one side of the granulator.

In Fig. 36 a much longer and differently mounted cylinder embodying my ore granulator is illustrated. This cylinder is provided at intervals of its length with reinforcement bands 2 and also adjacent to its ends with tread flanges 3 in which this cylinder is revolubly supported upon flanged wheels 4, a pair of which is positioned at each end thereof, forming ways for the tracks, 3, which lie within the flanges of the said rollers, and prevent endwise movement of the cylinder in either direction. The rollers on one side of the cylinder are secured to a shaft 5, which is journaled at each end in bearings carried by standards, 6. The rollers on the other side of the cylinder are secured to a shaft 7, which is journaled at each end in bearings carried by standards 8. The shaft, 7, about centrally between the rollers, carries a gear wheel, 9, which is designed to mesh with a band gear, 10, which encircles the cylinder A. Power is supplied to the gear wheel, 9, by any suitable arrangement of gearing, and is transmitted therefrom to the band gear 10, by which the cylinder is caused to revolve, as will be clearly seen by reference to Figs. 36 and 37. A stationary shaft, 11, passes centrally through the cylinder, and is supported at its ends by standards 12 and 13. The purpose of this shaft will be hereinafter fully explained. Within the cylinder, and pivotally attached to the periphery thereof, is a plurality of stamps or hammers 14 which are arranged in series of four stamps each, the series alternating as to the position of the pivotal or swinging point of the hammers, as will be more fully set forth.

The stamps or hammers are secured to the inner periphery of the cylinder in the following manner: The reinforcing bands, 2, before referred to, each encircles the cylinder at a point coincident with the position of a series of stamps 14, and at four equi-distant points; the said band is provided with bolt holes, which register with corresponding holes in the cylinder A, and through the continuous hole or opening thus formed, bolts 15, formed integral with hangers 16, are passed, and are secured by nuts as shown.

The hanger, 16, is formed so as to present depending ears 17, which are apertured as shown at 18, and between the ears 17, the reduced end or arm of a stamp 14 is swung by passing a bolt through the aperture 18, and through a corresponding aperture in the reduced end of the stamp. By this arrangement the stamp has a free swinging movement when the cylinder is revolved, and is also quickly attached and detached. The stamp is of the design shown in the several views, though in some instances it may be desirable to serrate the face thereof, as shown in the modified form, Fig. 49.

By reference to Fig. 37 the positions assumed by the several stamps will be clearly seen. Now by following the course of a single stamp or of all the stamps whose swinging points are in the same line, it will be observed that as the cylinder revolves in the direction of the arrow they are suspended from their several hangers, until they gradually contact with the periphery of the cylinder, in which relation they are carried around until they reach the position shown in dotted lines, when they are acted upon by gravity and swing downward. The stamps in the same series or line immediately beneath are then in position to receive the blow from the descending stamps above, and thus act as dies, as will be understood. As soon as the drop of one line of stamps is effected, another line is almost instantaneously moved into position, causing, practically, a continuous series of blows, and this result is attained by alternating the sets or series of stamps as before mentioned.

In Figs. 43 and 44 I have illustrated eight sets of stamps with four stamps in each set, making thirty-two stamps in all. Now, as the sets alternate with each other, it will be seen, that at each $\frac{1}{8}$ revolution of the cylinder, a line of four stamps will drop, and in a complete revolution, eight lines of four stamps, or thirty-two stamps in all, will drop. Thus by revolving the cylinder at even a moderately high rate of speed, a large number of drops or blows per minute may be effected. As the cylinder revolves in the direction of the arrow, the heavy end of the stamp will always be in advance of their swinging points, thus very largely neutralizing the effect of the centrifugal force developed, which might tend to cause the stamps to lie against the periphery of the cylinder, beyond the time when they should drop. But in order to overcome this tendency, and to insure the drop of the stamps at the proper time, the stationary shaft 11, which extends centrally through the cylinder, is provided at intervals with arms 19, which are secured to the said shaft by set screws 20 to as to have a rigid connection therewith. These arms may be constructed as shown in Figs. 39 to 42, and the free end thereof is extended laterally to form a fluke 21, as shown. The arms are positioned to lie between two sets of stamps, as shown in Fig. 38, so that the laterally extending fluke 21 will serve to operate on the stamps in each set. Now, just before the stamp reaches the point in its revolution when it should fall by gravity, its curved surface $14^a$ will contact with the fluke 21, which, by the continued revolution of the cylinder, will be forced in between the stamp and the periphery of the cylinder, thus overcoming the centrifugal force operating upon the said stamp, and causing it to drop at the proper time. By the use of this arm, the cylinder may be run at a high rate of speed, and the drop of the stamp insured at the proper time.

In Figs. 41 and 42, I have shown a modification of the arm in which the fluke 21 is provided with anti-friction rollers $21^a$ against which the curved surface $14^a$ of the stamp will contact, as before described. The feed end of the cylinder is covered by a head, 22, which is provided centrally with an opening 23, through which the spout of a hopper 24 is inserted. The head 22 is of greater diameter than the cylinder, and the circumference thereof is fluted or serrated as shown at 25. The extreme end of the cylinder is encircled by a flanged band, 26, and bolts passing through the head, and through the flange on the band 26, secures the said head to the cylinder. A ring of suitable packing 27, is interposed between the head 22, and the flange on the band 26, in order to make a water-tight connection. The head may be provided with openings, $22^a$, as shown, and when so desired, the said openings may be covered by a suitable dust-proof cap or cover $22^b$. The hopper 24 is of the form shown in the drawings, and may be supported by a bracket 28, which, in turn, is secured to the standard 12, or any suitable means of supporting it may be employed. The side of the hopper next to the cylinder is provided with a pair of projections or ears 29, which are located one above the other and are vertically apertured. A rod 30 extends through the apertures in the ears 29, and extends a short distance above the level of the mouth of the hopper, where it is secured in any suitable manner to the horizontal member of an agitator 31, which, as shown, depends vertically for a suitable distance within the hopper, and there is curved or bent so that its extremity will lie within the throat or spout of the hopper. The horizontal member 32, of the agitator, is engaged by the flutes or serrations 25, in the circumference of the head 22; thus, as the cylinder is revolved, the agitator will be given a quick reciprocating motion, and the curved free end thereof which lies in the throat of the hopper, will effectually prevent choking as the ore is being fed to the cylinder. A helical spring 33 encircles the rod 30, between the ears 29, one end bearing against the topmost ear, while the other end engages a pin which passes through the rod. The rod is thus normally held down and is raised against the action of the helical spring 33 by the fluted circumference 25, of the head 22, as before stated. Each end of the cylinder is braced by a spider 34, having a central hub 35, which revolves upon the shaft 11, as the cylinder is revolved. The discharge end of the cylinder is provided with a screen 36 of any suitable mesh, which, as shown in Fig. 36 is clamped between a flanged band 37 encircling the said end of the cylinder, and a ring 38. This forms an easy and convenient manner of attaching the screen, though the same may be secured in any preferred way.

The description thus far, has been confined to the form of granulator shown in Figs. 1 to 38. In the remaining figures, I have shown various modifications, which I will proceed to describe.

In Fig. 43, the cylinder is provided at each end with the spiders 34, which, however, instead of revolving upon the shaft 11, are rigidly secured thereto by set screws 34ª, which pass through the hub 35, and the shaft revolves in bearings carried by the standards 12 and 13, one end of said shaft being provided either with a pulley or gear wheel 39, through which power is transmitted to the shaft from any suitable source. The band gear 10 is thus dispensed with, and the cylinder receives motion through its connection with the revoluble shaft 11, as shown. In this figure I have shown a screen 36ª, which is in the form of a frustum of a cone thus affording two surfaces through which the granulated ore and water may pass, the slanting or conical surface being especially adapted to screen the product which lies at the bottom of the cylinder, and is carried forward by the revolution thereof, while the vertical face of the said screen receives the splash caused by the drop of the forward set of stamps, and prevents the pulp which works up on the conical surface from escaping. In this figure I have shown a tilting device located under standard 12, at the feed end of the cylinder, which operates as follows: The said standard rests upon a wedge-shape plate, 80ᴬ, the upper surface of which is on a horizontal plane, while the under surface, which inclines as shown, rests upon the inclined surface or face of a base block 81, which is secured to a suitable foundation by bolts 82. The front portion of the base block 81 projects vertically as shown at 83, and has a threaded hole which receives a screw 84, the end of which bears against the front vertical face of the wedge shaped plate 80ᴬ. By turning the screw 84 in one direction, the plate 80ᴬ will slide upon the inclined face of the base block 81, and elevate the standard 12, and consequently the end of the cylinder, and when turned in the opposite direction, the weight upon the plate 80, will cause it to slide backward, which movement will lower the standard 12. The vertical member 83 has formed, at right angles thereto a horizontal member 85, the forward end of which divides or is U-shaped, thus forming two arms 86, which lie, one on each side of the standard 12. The extremities of these arms 86 are enlarged to form heads 87, the inner faces of which are provided with vertical grooves, which overlie ribs 88 formed on each side of the standard 12. By this means, the standard is permitted a free vertical movement, but any horizontal movement is prevented. The standard 13, at the discharge end of the cylinder, has a member 89 in hinged engagement therewith, which provides a bearing for the shaft 11, and rocks to accommodate itself to the angle of the shaft, when the feed end of the cylinder is elevated.

In Figs. 44 and 45, I have illustrated a form of revoluble granulator, in which the central shaft is dispensed with, and the cylinder is supported upon flanged friction rollers 40, which are located, one near each end beneath the said cylinder, and engage the tracks 3 thereof. The rollers 40 are carried by a shaft 41, which is provided at one end, with a beveled pinion 42, in mesh with a corresponding pinion 43, which receives power from any suitable source. The cylinder is supported, laterally, by flanged rollers 44, which contact with the tracks, 3, as shown, and are supported by standards 45. The discharge end of this cylinder is provided with a cap or head 46, which has a central opening somewhat smaller in diameter than the cylinder, around which is a flared rim 47, to which a screen 48, similar to the one shown in Fig. 43 is secured. The space between the opening in the cap 46, and the periphery of the cylinder, forms a wall, 49, which will prevent the escape of the pulp through the screen, until a certain depth of pulp has accumulated in the bottom of the cylinder. The wall, 49, is provided with a series of sliding doors 50, as shown, which, when it is desired to wash out the cylinder, may be opened; and by slowly revolving the cylinder while water is introduced at the feed end thereof, all pulp will be dislodged and will pass out through the doors 50. In instances where frequent tests of different grades or characters of ore are made, a thorough clean-up of the cylinder is essential, and this is easily accomplished in the manner above described.

Fig. 46 shows the same form of cylinder illustrated in Figs. 44 and 45 but the manner of supporting the same is identical with that shown in Fig. 37, wherein a pair of rollers 4 are located beneath each end of the cylinder.

In Fig. 47, I have illustrated in perspective, the feed end of the cylinder shown in Fig. 44 in which the arrangement of the sliding doors, 50, is clearly seen.

Fig. 50 illustrates another manner of supporting the swinging stamp, which is as follows:—The periphery of the cylinder at the swinging point of each stamp, is provided with a manhole, 51, which is designed to be closed by a suitable cover, 52, provided centrally with an aperture 53, through which the bolt, 15, of a hanger 16 is passed. The threaded end of the bolt 15 passes through the hub of a spider, 54, which is secured to the cylinder so as to span the opening or manhole 51, and a nut 55, is screwed upon the bolt and against the hub of the spider, so as to support the stamp and hold the cover of the manhole in place. By this arrangement, the stamp may be attached or removed through the manhole, when it is desired to replace the same with a new one or when a worn pivot bolt is replaced by a new one.

Fig. 51 illustrates a modification of the cylinder, in which provision is made for cushioning the blow of the hammers, and for swinging the same from a pivotal point which is on a plane with the inner periphery of the cylinder. The periphery of the cylinder, at the swinging point of each stamp, is provided with an opening or manhole 56, which is closed by an outwardly-dished cover 57, the rim of which is flanged, as at 58, to engage the inner portion of the cylinder immediately surrounding the manhole, which is elliptical, and by properly manipulating the cover, the same may be withdrawn through the manhole when desired, as will be fully understood. The hanger 16, rests in the dished cover 57, as shown, and the bolt 15 thereof, passes through a central aperture in the said cover, and through the hub portion of a spider 58ᴬ, which straddles the manhole, and contacts with the outer periphery of the cylinder, and the outer, threaded end thereof, receives a nut 59, which when tightly screwed upon the said bolt, and against the hub of the spider, securely clamps the spider and cover, the former against the outer, and the latter against the inner periphery of the cylinder, as will be clearly seen by reference to the drawing. By this arrangement the pivotal point of the stamp is on a lower plane than in the other forms shown, thus providing for a stamp of less depth, for it will be observed that the face of the stamp when lying flat in the cylinder must be identical with a line drawn from its pivotal point to the pivotal point of the stamp next in direction of the revolution of the cylinder, in order that when a stamp falls its surface may contact evenly with the surface of the stamp forming its die. Midway between the manholes 56, and on a line therewith, the cylinder is provided with manholes 60, which receive dished covers 61 similar to the covers 57, but of a greater depth. The rims of these covers are flanged as at 62, and contact with the inner surface of the cylinder immediately surrounding the manholes as shown. A spider, 63, straddles these manholes, and a bolt 64, passing through a central aperture in the cover, and through the hub of the spider, and receiving a nut 65 at its threaded end, locks the cover and spider respectively to the inner and outer peripheries of the cylinder in a manner similar to that just described. The bolt 64 is integrally connected to an elongated head 66, which serves to center a stout helical spring 67, which acts as a cushion against which one of the stamps lies when it is struck by the stamp just above. The spring 67 normally holds the stamp slightly elevated, but when the said stamp, which now acts in the capacity of a die—is struck by the descending stamp just above, the spring 67 will receive the impact from the blow, which will greatly reduce the wear and strain upon the cylinder and also tend to granulate, rather than to pulverize the ore lying between the faces of the stamps, thus producing a product from which a greater saving of values is effected than from a finely pulverized product, much of which would inevitably pass off in slimes, thus causing a considerable loss in values. The spring 67 may be held in position upon the elongated head 66, by a pin 68, which passes through the head, and over a coil of the spring, thus retaining the said spring in its proper position as the cylinder is revolved. With this form of cylinder, access may be had to all the working parts located in the interior thereof without the necessity of removing the cap or head at either end. The faces of the pivoted stamps employed in this modification may be serrated, like those heretofore described, as indicated on one pair of stamps by the broken line 99.

In Fig. 52, I have shown means for tilting the cylinder, consisting of a standard, the upper portion of which is in the form of a rectangular frame 69 in which moves vertically a frame 70, which is shorter in length. The upper and lower members of the frame 69, are each provided with a square-threaded screw 71, which support the frame 70, and raise and lower the same in the frame 69, as shown. The frame 70 carries a bearing block 72 in which is supported one end of the shaft 11 which extends through the cylinder. The block 72 is provided with lateral trunnions 73 which have bearings in the movable frame 70, so that as the frame 70 is moved up or down, the block 72 may have a rocking movement therein to accommodate itself to the angle of shaft 11, which it supports. The standard 74 at the rear, or feed end of the machine, carries a bearing block 75, similar to block 72, which supports the rear end of shaft 11, having lateral trunnions 76 which have bearings in the upper end of standard 74, as shown and permit the block to have a rocking or oscillating movement when the forward end of the standard is raised or lowered. The standards 77 in which are journaled the shafts carrying the supporting rollers 4 for the cylinder, are similar to the one which supports the discharge end of the cylinder, and therefore need no description. In this instance, the supporting rollers 4 have a sliding movement on their shafts permitting them to accommodate themselves to the track 3, when the cylinder is tilted.

In Fig. 52 I have also shown a modification of the reinforcing bands 2, which in this instance are in the form of rods which encircle the cylinder, and which are flattened and apertured at the four points where the bolts 15 of the hangers 16 pass through. The ends of the rods are connected by an ordinary bolt lock, and in this manner excessive length, due to expansion, may be taken up.

In Figs. 55 and 56 I have shown a form of revoluble cylinder having a lining composed of blocks 78 of chilled steel casting or chilled cast iron, or any other suitable analogous material, which interlock with each other and are arranged so as to provide recesses 79, in which the stamps 14 may lie, as will be clearly seen. The lining thus formed, furnishes a wearing surface which can be replaced when necessary, and as the face of the stamps acting as dies, project only slightly above the surface of the said lining, it is only necessary to maintain a bed of ore of slight depth, within the cylinder that the same may be properly acted upon by the hammer stamp, whereas in the other forms of cylinder, a bed of ore of greater depth must be maintained.

In Fig. 22 I illustrate my preferred construction of ore granulator in which but one set of hammer stamps is used, and which is adapted to receive and retain in a practical operative form a quantity of mercury. A machine containing but one set of hammer stamps would range in capacity from two and a half to ten tons per day, and when granulating a free gold quartz ore it might be advisable in some cases where the ore conditions would not warrant the installation of species of amalgamation machinery to keep a small quantity of mercury in the cylinder. In order to keep mercury in practical amalgamating condition in this machine it must be kept in a body at the bottom of the cylinder; consequently it is necessary to provide the die blocks, and the ore guide blocks in machines when they are used instead of the die blocks, with channels 80, that will facilitate the return of any mercury that may be carried up the upward moving side of the cylinder as it rotates and also to prevent mercury when carried upon the face surface of the dies and ore guide blocks from running onto the hammer striking surfaces of the dies or of the over-lapping hammer stamp when they are in position to form dies. In order to adapt the machine to meet the conditions required I make the dies and guide-blocks and hammer stamps enough narrower than the width of the cylinder to form a circumferential path around the inner periphery of the cylinder on each side of the dies or guide blocks in which the mercury will lay at the bottom portion of the cylinder as though the cylinder were stationary, but as the entrance to the hoods is substantially on a level with the inner periphery of the cylinder the mercury or a portion of it will flow in them as each passes the bottom of the cylinder and thus a portion in running out of the hood will run over the top surfaces of the dies or guide blocks. Consequently I provide the top surfaces of the dies or ore guide blocks with a central broad groove 80, which branches in opposite directions from the center to the side edges of the dies, as shown in Figs. 22, 23 and 24. It is very essential that the mercury be guided away from the striking surface of the die sbecause if the hammers strike any mercury they will spatter it and quickly flour it.

As the cylinder revolves in the direction of the arrows the hammer stamps swing across the cylinder from one side to the other over the top of the shaft M as shown at the top of Figs. 37, 45, 45 and 51 and each hammer finds a natural resting place against the inner periphery of the downward moving side of the cylinder, in which position they remain as they move with the cylinder across the bottom portion of the cylinder and up its upward moving side until they stand in a substantially vertical position against the periphery of the cylinder with the hammer stamps uppermost, as shown in Figs. 37 and 46, in which position each hammer is nearer the axis of the cylinder than the pivotal center of its handle and from which position they will drop by gravity, as shown in Figs. 45 and 51, if the rotative speed of the cylinder is not too great or does not exceed about 50 revolutions per minute. They are however, preferably forced to drop by the hammer actuating arms N, the flukes of which engage them and positively force them out in as natural a curve as they would drop themselves but with much quicker movement, and where the hammer actuating arms are used the rotative speed of the cylinder may be increased to about 50 to 100 revolutions per minute, depending upon the diameter of the cylinder. A much greater rotative movement would generate centrifugal force that would tend to hold the hammer stamps continually against the inner periphery of the cylinder. But up to a reasonable limit of rotative speed for duty of this character any centrifugal force developed would not in the least interfere with the smooth, even and positive outward swinging movement of the hammers by the hammer actuating arms. It is impossible for the hammer stamps to pass the arms without being thrown down. After the hammers have been thrown down however their handles rise first and the hammers swing out by the actuating arms, or if they should, or their lugs engage the arms they will be moved quickly towards the opposite side of the cylinder. The actuating arms N are preferably made hollow, as before stated. The shaft M is also provided with holes $M^1$ which register with the openings $N^5$ in the hubs $N^1$, thus forming a water passage between the shaft and arms. Both ends of the shaft are threaded and to one end a plug $M^2$ is threadedly secured to one end while a suitable connection is made with the open end with a hose or pipe to a source of water supply from which water is introduced under pressure and fills the pipe and arms and discharges from the ends of the arms through a plurality of small holes $N^6$ at the extremity of each arm. Apertures $M^3$ may also be made in the shaft if desired. In this way water is mixed with the ore as it is being granulated. When wet crushing is desired the water which is discharged from the arms washes down the upwardly moving side of the cylinder and keeps the ore pulp from adhering to the cylinder by continuously washing it down and will also wash all gritty matter from the hoods and from the pivotal points between the bolts and the bolt holes in the handle of the hammers, thus greatly reducing the wear of this pivotal connection.

It will be readily seen that the hammer stamps strike sharp, quick clean blows without any grinding or sliding movement on the ore or dies that would tend to make the fine dust or powder known as slimes, but that would tend to break up the pieces of rock finer and finer until all was reduced to a substantially even granulated product. As the stamps that are adjacent to the screens drop a portion of the granulated ore is thrown up against them and that portion that has been granulated fine enough passes through the screen while the remainder slides back on to the face of the dies and is continuously regranulated until it will pass the screens. The ore that passes the screens falls into the screen incasing chute and is led from the granulator for further treatment that will separate the mineral values from it, such as roasting, concentration, amalgamation, cyanid, chlorination, smelting and lixiviation.

While I have fully illustrated and described the essential elements and their general arrangement in my ore granulation I do not wish to be limited to the construction shown as my invention contemplates any and all arrangements of a revolving cylinder provided with a suitable feed inlet and a suitable discharge outlet containing a plurality of hammers so arranged as to drop successively therein in their order of coöperative rotation with said cylinder upon a bed of ore or other material in said cylinder, in which said hammers are brought into operative action by the rotative movement of the cylinder or by coöperation with an axially fixed element arranged to positively secure the gravity movement of said hammers against the centrifugal force of the revolving cylinder. The term "dies," as used in the claims, is intended to include both the separate die-blocks fixed to the drum and the movable die-blocks constituted by the lower hammer-heads.

Having described my invention, what I claim as new and desire to secure by Letters Patent, is:

1. An ore granulator, comprising a revoluble drum having imperforate sides, a plurality of hammer stamps within and pivoted circumferentially on said drum, and a plurality of dies carried by said drum in position to receive the blows of said stamps, substantially as described.

2. An ore granulator, comprising a revoluble drum having end portions to retain ore, a plurality of hammer stamps arranged out of longitudinal alinement within and pivoted circumferentially on said drum, and a plurality of dies carried by said drum in position to receive the blows of said stamps, substantially as described.

3. An ore granulator, comprising a revoluble carrier, and a plurality of hammer stamps within and pivoted circumferentially on said carrier, said stamps arranged to successively fall inwardly and strike upon a lower stamp, acting as a die, as the carrier revolves, substantially as described.

4. An ore granulator, comprising a revoluble drum for holding ore, and a plurality of hammer stamps within and pivoted circumferentially on said drum, said stamps arranged to successively fall inwardly and strike upon a lower stamp, acting as a die, as the drum revolves, substantially as described.

5. An ore granulator, comprising a revoluble drum for holding ore, a plurality of hammer stamps within and pivoted circumferentially on said drum, said stamps arranged to successively fall inwardly and strike upon a lower stamp, acting as a die, as the drum revolves, and a spring in position to cushion each hammer as it receives the blow of another hammer, substantially as described.

6. An ore granulator, comprising a revoluble drum for holding ore, a plurality of hammer stamps within and pivoted circumferentially on said drum, and a plurality of spring-cushioned dies carried by said drum in position to receive the blows of said stamps, substantially as described.

7. An ore granulator, comprising a revoluble drum for holding ore, a plurality of hammer stamps having flexible arms pivoted circumferentially on said drum, and a plurality of dies carried by said drum in position to receive the blows of said stamps, substantially as described.

8. An ore granulator, comprising a revoluble drum for holding ore, a plurality of hammer stamps within and pivoted circumferentially on said drum, and a plurality of dies carried by said drum in position to receive the blows of said stamps, said stamps and dies having transversely serrated faces, substantially as described.

9. An ore granulator, comprising a revoluble drum having imperforate sides, a plurality of hammer stamps within and pivoted circumferentially on said drum, a plurality of dies carried by said drum in position to receive the blows of said stamps, and guides for directing the ore onto said dies, substantially as described.

10. An ore granulator, comprising a revoluble drum for holding ore, a plurality of hammer stamps within and pivoted circumferentially on said drum, a plurality of dies carried by said drum in position to receive the blows of said stamps, and means for successively forcing said stamps inwardly as the drum rotates, substantially as described.

11. An ore granulator, comprising a revoluble drum for holding ore, a plurality of hammer stamps within and pivoted circumferentially on said drum, a plurality of dies carried by said drum in position to receive the blows of said stamps, and a fixed arm in position to successively force said stamps inwardly as the drum rotates, substantially as described.

12. An ore granulator, comprising a revoluble drum for holding ore, a plurality of hammer stamps within and pivoted circumferentially on said drum, a plurality of dies carried by said drum in position to receive the blows of said stamps, and an adjustable, fixed shaft extending longitudinally through said drum and carrying an arm in position to successively force said stamps inwardly as the drum rotates, substantially as described.

13. An ore granulator, comprising a revoluble drum for holding ore, a plurality of hammer stamps within and pivoted circumferentially on said drum, a plurality of dies carried by said drum in position to receive the blows of said stamps, and a fixed arm having a side lug or fluke in position to successively force said stamps inwardly as the drum rotates, substantially as described.

14. An ore granulator, comprising a revoluble drum having imperforate sides, a plurality of hammer stamps within and pivoted circumferentially on said drum, a plurality of dies carried by said drum in position to receive the blows of said stamps, and means for introducing water into said drum, substantially as described.

15. An ore granulator, comprising a revoluble drum for holding ore, a plurality of hammer stamps within and pivoted circumferentially on said drum, a plurality of dies carried by said drum in position to receive the blows of said stamps, a hollow, perforated, fixed arm in position to successively force said stamps inwardly as the drum rotates, and means for supplying water to said arm, substantially as described.

16. An ore granulator, comprising a revoluble drum having imperforate sides, a plurality of hammer stamps within and pivoted circumferentially on said drum, a plurality of dies carried by said drum in position to receive the blows of said stamps, means for continuously feeding ore into one end of said drum and means for removing the granulated product from the other end of said drum, substantially as described.

17. An ore granulator, comprising a revoluble drum having imperforate sides, a plurality of hammer stamps within and pivoted circumferentially on said drum, a plurality of dies carried by said drum in position to receive the blows of said stamps, a feed hopper opening into one end of said drum, and a screen carried by the other end of said drum, substantially as described.

18. An ore granulator, comprising a revoluble drum for holding ore, a plurality of hammer stamps within and pivoted circumferentially on said drum, a plurality of dies carried by said drum in position to receive the blows of said stamps, a feed hopper opening into one end of said drum, and a frusto-conical screen carried by the other end of said drum, substantially as described.

19. An ore granulator, comprising a revoluble drum having imperforate sides, a plurality of hammer stamps within and pivoted circumferentially on said drum, a plurality of dies carried by said drum in position to receive the blows of said stamps, a feed hopper opening into one end of said drum, a screen carried by the other end of said drum, and a receiving trough partially inclosing said screen, substantially as described.

20. An ore granulator, comprising a revoluble drum for holding ore, a plurality of hammer stamps within and pivoted circumferentially on said drum, a plurality of dies carried by said drum in position to receive the blows of said stamps, a feed hopper opening into one end of said drum, an agitator in said hopper, and cams on said drum in position to actuate said agitator, substantially as described.

21. An ore granulator, comprising a revoluble drum for holding ore, a plurality of hammer stamps within and pivoted circumferentially on said drum, a plurality of dies carried by said drum in position to receive the blows of said stamps, means for successively forcing said stamps inwardly as the drum rotates, a feed hopper opening into one end of said drum, and a screen carried by the other end of said drum, substantially as described.

22. An ore granulator, comprising a revoluble drum having internal recesses, a plurality of hammer stamps having arms pivoted in said recesses circumferentially of the drum, and a plurality of dies carried by said drum in position to receive the blows of said stamps, substantially as described.

23. An ore granulator, comprising an ore drum having internal recesses, pivots in said recesses and removable from the outside of said drum, a plurality of hammer stamps having arms mounted on said pivots circumferentially of the drum, and a plurality of dies carried by said drum in position to receive the blows of said stamps, substantially as described.

24. An ore granulator, comprising an ore drum having apertures, hoods detachably secured over said apertures and carrying pivots, a plurality of hammer stamps mounted on said pivots, and a plurality of dies carried by said drum in position to receive the blows of said stamps, substantially as described.

25. An ore granulator, comprising a revoluble drum for holding ore, a plurality of hammer stamps within and pivoted circumferentially on said drum, a plurality of dies carried by said drum in position to receive the blows of said stamps, a body of mercury in said drum, and grooves in the face of each die to discharge the mercury therefrom as the drum rotates, substantially as described.

26. In an ore granulator an ore receiving cylinder, a plurality of hammer stamps pivotally secured to the inner periphery of said cylinder and arranged to overlap and register one upon the other, and means for rotating said cylinder to cause said hammer stamps to drop one upon the other in successive order.

27. In an ore granulator, an ore holding cylinder, a plurality of hammer stamps supported in said cylinder and arranged to overlap and register one over the other; means for rotating said cylinder and means for causing said hammer stamps to drop one upon the other in successive operative order whereby each hammer stamp acts as a die for the preceding hammer stamp in the order of said cylinder's rotative and operative movement.

28. In an ore granulator, an ore holding cylinder, a plurality of hammer stamps provided with handle portions supported at their free ends at predetermined points in the inner periphery of said cylinder and arranged and adapted to overlap and to register one over the other in their joint operative positions of use whereby each hammer stamp forms a die or shoe for the preceding hammer stamp in the order of their operative ore granulating action, and means including the rotation of said ore holding cylinder for causing said hammer stamps to drop in successive order, one on the other in the order of their rotative movement.

29. In an ore granulator, an ore receiving cylinder, a plurality of apertures arranged at predetermined points in the circumference of said cylinder, hoods removably secured to said apertures, hammer stamps secured to said hoods and arranged and adapted to swing through an arc of the circle of said cylinder's inner periphery, dies secured to the inner periphery of said cylinder in the striking path of said hammer stamps, substantially as described, and means for rotating said cylinder, substantially as described.

30. In an ore granulator, an ore receiving cylinder provided with a plurality of apertures arranged at substantially equal distances apart hoods removably secured to cover said apertures, hammer stamps pivotally secured in said hoods and means for rotating said cylinder in such a manner as to cause said hammer stamps to drop through an arc of the circle of said cylinder's inner periphery in the order of their arrangement in operative ore granulating action, substantially as described.

31. In an ore granulator, an ore receiving cylinder provided with a plurality of apertures, hoods secured to cover said apertures, a plurality of hammer stamps pivotally secured at one end to said hoods and arranged to fall with a swinging drop through an arc of the circle of said cylinder's inner periphery, a die surface arranged to receive the drop blow of each of said hammer stamps, means for feeding ore to said cylinder, a discharge outlet for the granulated ore and means for rotating said cylinder, substantially as described.

32. In an ore granulator, the combination with a rotatable cylinder provided with a plurality of apertures arranged at substantially equal distances apart, hoods detachably secured to cover said apertures, a hammer stamp pivotally secured to each hood a flexible handle portion to each hammer stamp, a suitable stamp die in said cylinder arranged to receive the blows of said hammer stamps, a cylinder head at each end of said cylinder, a trunnion at each cylinder head; supporting standards rotatably journaled to the trunnions of said cylinder heads, a hopper arranged to feed ore through one cylinder head, ore discharge apertures in the opposite cylinder head, screens arranged to fit said apertures, a frame arranged to removably secure said screens in said apertures, means including pivotal supports and a hand wheel for raising or lowering one end of said cylinder above a horizontal level and means including a fixed arm for forcing each hammer stamp to drop at a predetermined part of the ore holding portion of said cylinder, substantially as described.

33. In an ore granulator, the combination with the cylinder and the hammer stamps, of the rear cylinder head provided with a trunnion portion, a series of radial apertures in said cylinder head, a screen supporting disk secured to said trunnion at a short distance from apertures in said cylinder head having radial arms extending at an angle to near the outer periphery of said cylinder head, a peripheral rib formed on the arms of said screen supporting disk, means for securing said peripheral rib to said cylinder head, an aperture between said disk and each of its arms and its peripheral rib, a marginal stepped rib round said arms and rim and the edge of said disk, a screen fitting loosely in said marginal stepped lip and an open frame arranged to fit in said stepped lip and to removably clamp said screen to the aperture of said screen supporting disk, substantially as described.

34. In an ore granulator, the combination with an ore receiving rotating cylinder of a plurality of swinging drop hammer stamps pivotally secured, and arranged and adapted to swing out and drop when rotating with the upwardly moving side of said cylinder as it rotates, a suitable die stamp in said cylinder arranged to receive the blow of each hammer stamp, a projecting lug on the opposite sides of each hammer stamp, a fixed shaft extending through said cylinder, a plurality of arms rigidly secured to said shaft and extending close to the periphery of said cylinder, a downward curved end at the end of each arm having a fluke extending laterally beyond the arm and arranged in the rotating path of said projecting lug on the sides of said hammer stamps and arranged to be engaged by said lugs as said hammer stamps move upward with the rotative movement of said cylinder and to force said hammer stamps to swing violently outward and down against said dies, means for adjusting said arms and shaft to cause said hammer stamps to forcibly drop on the dies at any predetermined part of the ore holding portion of said cylinder, means including a hopper for feeding ore to said cylinder, means including a screened aperture for discharging and sizing the discharging ore from said cylinder, and means for rotating said cylinder, substantially as described.

35. In an ore granulator, the combination of the cylinder containing a plurality of apertures covered by hoods which radiate beyond the periphery of said cylinder and a plurality of hammer stamps pivotally secured to said hoods near the periphery of said cylinder, substantially as described.

36. In an ore granulator, the combination of the cylinder containing a plurality of apertures at predetermined distances apart, a hood removably secured to each aperture and a plurality of hammer stamps pivotally secured to said hoods substantially at the periphery of the shell of said cylinder, substantially as described.

37. In an ore granulator, a horizontally disposed, revoluble cylinder, the periphery of which is provided with manholes arranged in circular series which alternate, the said manholes being provided with centrally apertured covers; the cylinder having a screen at one end, a hopper located at the other end, and means for supporting and tilting the said cylinder; in combination with stamps or hammers which are located within the cylinder and are pivotally suspended from hangers, the said hangers each having a shank which projects through the aperture in the cover of the aforesaid manhole, and through the hub of a suitable spider which straddles the manhole, the extremity of said shank being threaded and receiving a nut, substantially as shown.

38. An ore granulator, consisting of a horizontally disposed revoluble cylinder, the periphery of which is provided with manholes which are arranged in circular series which alternate; dished covers for said manholes having central apertures; spiders which straddle the said manholes having hubs provided with central bolt holes which register with the aperture in the aforesaid covers; hangers seated in each alternate cover in a circular series; the said hangers having shank members which pass through the apertures in the cover, and through the hole in the spider, and receive a nut which clamps the cover and spider to the inner and outer periphery of the cylinder respectively; cushion springs seated in the remaining covers so as to alternate with the hangers; and stamps or hammers which are pivoted to the said hangers, so that they will rest upon the springs as the cylinder revolves and form dies; upon which the stamps next in direction of rotation, will fall, the said springs receiving the impact from the blow; in combination with means for supporting and rotating the said cylinder, substantially as shown.

39. In an ore granulator, a horizontally disposed, revoluble cylinder provided at one end with a screen and at the other end with a hopper; stamps or hammers pivotally secured to hangers upon the inner periphery of the cylinder and arranged in circular series which alternate; the said stamps alternately acting as die and stamp; spring cushions interposed beneath the dies which receive the impact from the blow of the descending stamps; in combination with means for supporting and revolving the said cylinder, substantially as shown.

40. In an ore granulator, a horizontally disposed revoluble cylinder, provided at one end with a screen and at the other end with a hopper; a stationary shaft which passes centrally through the cylinder, and means for supporting the same; arms secured upon the said shaft which extend to the periphery of the cylinder and are widened or fluked at their free ends; stamps or hammers which swing from hangers secured to the inner periphery of the cylinder and arranged in circular series which alternate, the said stamps acting alternately in the capacity of stamp and die, and being positioned to contact with the fluke on the aforesaid arm, so as to be thrown forward at a predetermined time; springs interposed beneath the dies, which receive the impact from the blow of the descending stamps; in combination with means for supporting and revolving the said cylinder, substantially as shown.

41. In an ore granulator, a horizontally disposed, revoluble cylinder, provided with a lining composed of blocks of cast steel, chilled cast iron, or any other suitable material, which interlock and are arranged so as to leave recesses in alternating series; stamps pivoted to the inner periphery of the cylinder, so as to lie within the said recesses as the cylinder is revolved; the faces of said stamps extending slightly above the plane of the inner periphery of the cylinder; in combination with means for supporting and revolving the cylinder, substantially as shown.

In testimony whereof I affix my signature in presence of two witnesses.

HOWARD S. BAILEY.

Witnesses:
BESSIE THOMPSON,
G. SARGENT ELLIOTT.